US011693179B2

(12) United States Patent
Tanaka et al.

(10) Patent No.: US 11,693,179 B2
(45) Date of Patent: Jul. 4, 2023

(54) WAVELENGTH CHECKER

(71) Applicant: Nippon Telegraph and Telephone Corporation, Tokyo (JP)

(72) Inventors: Takuya Tanaka, Tokyo (JP); Hiroshi Ishikawa, Tokyo (JP); Kota Shikama, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 278 days.

(21) Appl. No.: 17/285,209

(22) PCT Filed: Nov. 8, 2019

(86) PCT No.: PCT/JP2019/043838
§ 371 (c)(1),
(2) Date: Apr. 14, 2021

(87) PCT Pub. No.: WO2020/105472
PCT Pub. Date: May 28, 2020

(65) Prior Publication Data
US 2021/0373233 A1  Dec. 2, 2021

(30) Foreign Application Priority Data

Nov. 22, 2018  (JP) .............................. 2018-219011

(51) Int. Cl.
*G02B 6/12* (2006.01)
*G02B 6/42* (2006.01)
(52) U.S. Cl.
CPC ....... *G02B 6/12007* (2013.01); *G02B 6/4204* (2013.01); *G02B 6/4236* (2013.01); *G02B 2006/12038* (2013.01)
(58) Field of Classification Search
CPC .............. G02B 6/12007; G02B 6/4204; G02B 6/4236; G02B 2006/12038
(Continued)

(56) References Cited

U.S. PATENT DOCUMENTS

2003/0189698 A1\* 10/2003 Kuhara ............ H04B 10/07957
356/73.1
2004/0105610 A1  6/2004 Rahman
2009/0016716 A1  1/2009 Ishida

FOREIGN PATENT DOCUMENTS

JP  H08136404 A  5/1996
JP  H10104446 A  4/1998
(Continued)

OTHER PUBLICATIONS

Takahashi et al., "Transmission Characteristics of Arrayed Waveguide N×N Wavelength Multiplexer," Journal of Lightwave Technology, vol. 13, No. 3, Mar. 1995, pp. 147-455. As discussed in the specification.

(Continued)

*Primary Examiner* — Jerry M Blevins
(74) *Attorney, Agent, or Firm* — Slater Matsil, LLP

(57) ABSTRACT

A wavelength checker includes an optical waveguide chip. A known arrayed-waveguide diffraction grating is formed on the optical waveguide chip. The wavelength checker includes a light conversion unit made of a conversion material that converts infrared light into visible light. The light conversion unit is arranged on an output side of a plurality of first output waveguides of the optical waveguide chip to be capable of receiving light emitted from the plurality of first output waveguides. The light conversion unit is formed on a side surface of a support facing an output end surface of the optical waveguide chip. The support is fixed to a main board.

19 Claims, 14 Drawing Sheets

(58) Field of Classification Search
USPC .......................................................... 385/14
See application file for complete search history.

(56) References Cited

FOREIGN PATENT DOCUMENTS

| JP | 2003294961 A | 10/2003 |
|----|--------------|---------|
| JP | 2017032950 A | 2/2017  |

OTHER PUBLICATIONS

Takahashi, et al. "Wavelength Multiplexer Based on SiO2—Ta2O5 Arrayed-Waveguide Grating," Journal of Lightwave Technology, vol. 12, No. 6, Jun. 1994, IEEE, pp. 989-995. As discussed in the specification.

Ishikawa et al., "Pluggable Photonic Circuit Platform Using a Novel Passive Alignment Method," The Japan Society of Applied Physics, 22nd Microoptics Conference (MOC2017), Tokyo, Japan, Nov. 19-22, 2017, pp. 84-85. As discussed in the specification.

Kawano, "Fundamentals and Applications of Optical Coupling Systems," Hyundai Engineering Company, 34. Chapter 3. Coupling of Gaussian Beams, Jan. 25, 1991, 7 pages. As discussed in the specification.

Koma et al., "Standardization trends for faster PON systems," The Forefront of the Global Standard, NTT Access Network Service Systems Laboratories, NTT Technical Journal 2017, pp. 51-53. As discussed in the specification.

Shikama et al., "Pluggable photonic circuit platform for single-mode waveguide connections using novel passive alignment method," Japanese Journal of Applied Physics 57, 08PC03, 2018, 5 pages. As discussed in the specification.

Takahashi et al., "Array Waveguide diffraction grating for Wdm," Arrayed-waveguide grading for WDM systems, Featured Articles: More than Light Debtors for WDM Networks, NTT Opto-electronics Laboratories, 1997, pp. 685-692. As discussed in the specification.

* cited by examiner

HIGHLY SENSITIVELY MEASUREABLE WITH COMBINATION OF HIGH TRANSMITTED LIGHT INTENSITIES

WAVELENGTH CHECKER

CROSS-REFERENCE TO RELATED APPLICATIONS

This application is a national phase entry of PCT Application No. PCT/JP2019/043838, filed on Nov. 8, 2019, which claims priority to Japanese Application No. 2018-219011, filed on Nov. 22, 2018, which applications are hereby incorporated herein by reference.

TECHNICAL FIELD

The present invention relates to a wavelength checker, and more particularly to a wavelength checker for checking signal light during operational/failure isolation inspection of a PON system.

BACKGROUND

In a PON (Passive Optical Network)-based access system in an optical communication system, a plurality of types of light having relatively distant wavelengths such as a wavelength of 1.3 μm and a wavelength of 1.5 to 1.6 μm may be used at the same time.

According to Non-Patent Literature 1, a wavelength of 1260 nm to 1360 nm (only Regular band is described in G-PON) is used as a signal (uplink signal) from a user to a station in a GE-PON (G-PON) system that has already introduced. In the G-PON system, a wavelength of 1480 nm to 1500 nm is used as a signal (downlink signal) from the station to the user, and a wavelength of 1550 nm to 1560 nm is used as a downlink video signal.

In a 10G-EPON (XG-PON) system which will be introduced in the future, similarly, the wavelength of 1.3 μm and the wavelength of 1.5 to 1.6 μm are used. In an NG-PON2 system which has been standardized recently, a wavelength of 1524 nm to 1544 nm (Wide band) is used as an uplink signal, a wavelength of 1596 nm to 1603 nm is used as a downlink signal, and a wavelength of 1550 nm to 1560 nm is used as a downlink video signal. An optional PtPWDM (Point To Point Wavelength Division Multiplex) overlay will not be described. In this system, wavelength multiplexing is performed unlike the GE-PON (G-PON) and the 10G-EPON (XG-PON). Such wavelength arrangements are shown in FIG. 27.

By the way, in the PON system such as GE-PON, optical power is checked in an operational test. In the future, more various wavelengths will be used in the transition from the GE-PON to the 10G-EPON. In a test in such a situation, when the wavelength can be checked, the type of signal can be determined, failure isolation can be easily performed, and work efficiency can be improved.

CITATION LIST

Patent Literature

Patent Literature 1: Japanese Patent Laid-Open No. H10-104446
Patent Literature 2: Japanese Patent Laid-Open No. 2017-32950

Non-Patent Literature

Non-Patent Literature 1: Ryo Koma et al., "Standardization Trends for High-Speed of PON System", Journal of NTT Technology, August 2017, pp. 51-53.
Non-Patent Literature 2: Hiroshi Takahashi et al., "Arrayed-Waveguide Diffraction Grating for WDM", NTT R&D, vol. 46, no. 7, pp. 685-692, 1997.
Non-Patent Literature 3: H. Takahashi et al., "Transmission Characteristics of Arrayed Waveguide N×N Wavelength Multiplexer", Journal of Lightwave Technology, vol. 13, no. 3, pp. 447-455, 1995.
Non-Patent Literature 4: H. Ishikawa et al., "Pluggable Photonic Circuit Platform Using a Novel Passive Alignment Method", The Japan Society of Applied Physics, 22nd Microoptics Conference, D-6, pp. 84-85, 2017.
Non-Patent Literature 5: K. Shikama et al., "Pluggable photonic circuit platform for single-mode waveguide connections using novel passive alignment method", Japanese Journal of Applied Physics, vol. 57, 08PC03, 2018.
Non-Patent Literature 6: Kenji Kono, "Basics and Applications of Optical Coupling Systems for Optical Devices", GENDAI KOGAKUSHA, First Edition, 1991.
Non-Patent Literature 7: H. Takahashi et al., "Wavelength Multiplexer Based on SiO2-Ta2O5 Arrayed-Waveguide Grating", IEEE Journal of Lightwave Technology, vol. 12, no. 6, pp. 989-005, 1994.

SUMMARY

Technical Problem

An example of a means for measuring the wavelength includes an optical spectrum analyzer. However, since the optical spectrum analyzer has a movable unit used to detect diffracted light obtained by movement of a diffraction grating with a detector, the device is large and heavy, which makes portability difficult. There is also a drawback that a 100 V-power source is generally required. As described above, conventionally, there is a problem of unable to perform easily the checking whether the signal light is present during the operational/failure isolation inspection of the PON system.

Embodiments of the present invention have been made in order to solve the above problem, and an object thereof is to make it possible to easily perform the checking whether the signal light is present during the operational/failure isolation of the PON system.

Means for Solving the Problem

A wavelength checker according to embodiments of the present invention includes: an optical waveguide chip; and a light conversion unit made of a conversion material that converts near-infrared light into visible light, wherein the optical waveguide chip on a side connected to an optical fiber includes an arrayed-waveguide diffraction grating and is mounted on a main board, a support is fixed onto the main board, and the support is located at a position facing a light emitting end surface, through which light is output to an external space, of the optical waveguide chip, and the light conversion unit is provided on a side surface of the support facing the light emitting end surface.

In the above configuration example of the wavelength checker, the optical waveguide chip is laminated in two layers; the optical waveguide chip includes a substrate and a core and a clad on the substrate, or a substrate and a clad on the substrate; when the clad is defined as a front surface of the optical waveguide chip, the front surfaces of the laminated upper and lower layers of the optical waveguide chip face each other; when the optical waveguide chip on the lower layer is defined as a parent optical waveguide chip and the optical waveguide chip on the upper layer is defined as a child optical waveguide chip, the parent optical waveguide chip is one in number, and the child optical waveguide chip is many in number; a plurality of first grooves are formed in a clad portion of the parent optical waveguide chip, and a plurality of second grooves are formed in a clad portion of the child optical waveguide chip; each of the plurality of first grooves is fitted with a part of a plurality of spacer members protruding from the parent optical waveguide chip; each of the second grooves of the child optical waveguide chip is fitted with a protruding portion of any one of the plurality of spacer members; the child optical waveguide chip on the side connected to the optical fiber includes an arrayed-waveguide diffraction grating, and the other child optical waveguide chip includes at least one of a linear waveguide group and an arrayed-waveguide diffraction grating; and the parent optical waveguide chip is fixed to a main board.

In the above configuration example of the wavelength checker, the spacer member is made of an optical fiber.

In the above configuration example of the wavelength checker, the substrate of the optical waveguide chip is an Si substrate, and the core and the clad are made of quartz glass.

In the above configuration example of the wavelength checker, an end surface of the child optical waveguide chip on a side of the light conversion unit is located at the same position as an end surface of the parent optical waveguide chip on the side of the light conversion unit, or is arranged closer to the light conversion unit than the end surface of the parent optical waveguide chip on the side of the light conversion unit.

In the above configuration example of the wavelength checker, the child optical waveguide chips are arranged in a column in an incident direction of light.

In the above configuration example of the wavelength checker, in the arrayed-waveguide diffraction grating included in the child optical waveguide chip on the side connected to the optical fiber, the arrayed-waveguide diffraction grating includes an input waveguide, an input-side slab waveguide, a plurality of array waveguides, an output-side slab waveguide, and a plurality of output-side waveguide; the input-side slab waveguide, the plurality of array waveguides, and the output-side slab waveguide are formed in plan view to pass through a midpoint of a line segment connecting a center of the input-side slab waveguide and a center of the output-side slab waveguide and to be line-symmetrical about a straight line perpendicular to the line segment; the input waveguide includes a main input waveguide and a sub input waveguide; and when an interval at a connection portion of the plurality of output waveguides with the output-side slab waveguide is defined as $\Delta x_{out}$, an interval between a connection portion of the main input waveguide with the input-side slab waveguide and a connection portion of the sub input waveguide with the input-side slab waveguide is set to $\Delta x_{out}/2$.

In the above configuration example of the wavelength checker, the conversion material is phosphor.

Effects of Embodiments of the Invention

As described above, according to embodiments of the present invention, the light conversion unit made of the conversion material, which converts the infrared light into the visible light, is provided closer to the output sides of the plurality of first output waveguides of the optical waveguide chip and is arranged to be capable of receiving the light emitted from the plurality of first output waveguides, so that it is possible to easily perform the checking whether the signal light is present during the operational/failure isolation of a PON system.

BRIEF DESCRIPTION OF THE DRAWINGS

FIG. 12 is a characteristic diagram showing a calculation result of a transmittance spectrum of an arrayed-waveguide diffraction grating in a child optical waveguide chip 121a.

FIG. 20 is a characteristic diagram showing a calculation result of transmittance spectrum of an optical waveguide chip 101a and a child optical waveguide chip 121a.

FIG. 21 is a characteristic diagram showing a calculation result of a transmittance spectrum of port 7 of the optical waveguide chip 101a.

FIG. 22 is a characteristic diagram showing a calculation result of a spectrum that is transmitted through the optical waveguide chip 101a and the child optical waveguide chip 121a when a second input waveguide 128 of the child optical waveguide chip 121a is connected to port 7 of an output waveguide 107 of the optical waveguide chip 101a.

FIG. 23 is a characteristic diagram showing a calculation result of a transmittance spectrum of port 6 of the optical waveguide chip 101a.

FIG. 24 is a characteristic diagram showing a calculation result of a spectrum that is transmitted through the optical waveguide chip 101a and the child optical waveguide chip 121a when light enters from a sub input waveguide 106b to the arrayed-waveguide diffraction grating of the optical waveguide chip 101a and the second input waveguide 128 of the child optical waveguide chip 121a is connected to port 6 of the output waveguide 107 of the optical waveguide chip 101a.

DETAILED DESCRIPTION OF ILLUSTRATIVE EMBODIMENTS

Figure 1:
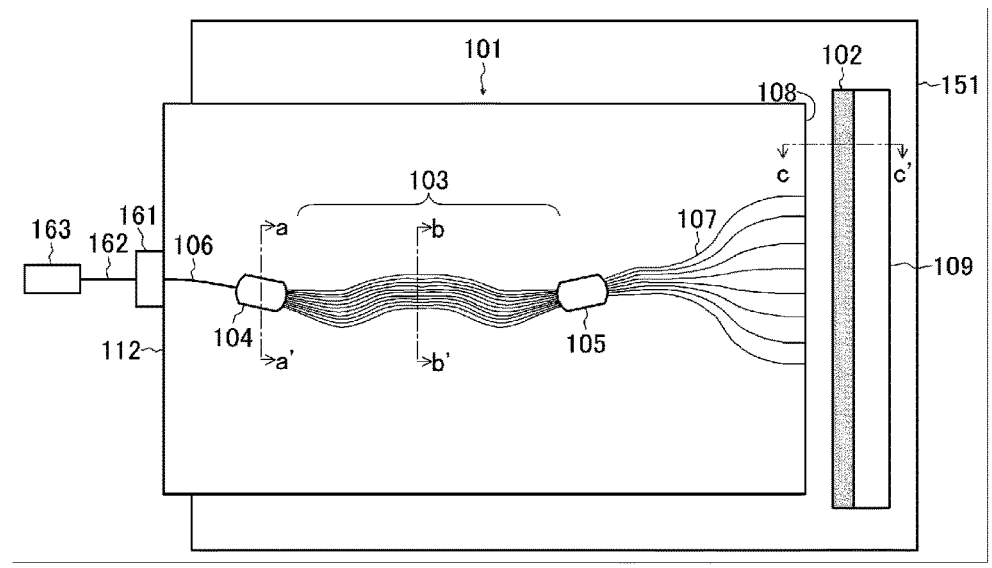
FIG. 1 is a plan view showing a configuration of a wavelength checker according to Embodiment 1 of the present invention.

Wavelength checkers according to embodiments of the present invention will be described below.

Embodiment 1

First, a wavelength checker according to Embodiment 1 of the present invention will be described with reference to FIG. 1.

The wavelength checker includes an optical waveguide chip 101. A known arrayed-waveguide diffraction grating is formed on the optical waveguide chip 101 (see Patent literature 1). The arrayed-waveguide diffraction grating includes a first arrayed waveguide 103, a first input-side slab waveguide 104, a first output-side slab waveguide 105, a first input waveguide 106, and a first output waveguide 107. FIG. 1 shows a plane of the wavelength checker. Reference numeral 151 denotes a main board, reference numeral 109 denotes a support, and reference numeral 102 denotes a light conversion unit made of a conversion material that converts near-infrared light into visible light. In addition, reference numeral 161 denotes a fiber block, reference numeral 162 denotes an optical fiber, and reference numeral 163 denotes a connector.

The first arrayed waveguide 103 includes a plurality of waveguides having a constant optical path-length difference. The first arrayed waveguide 103 is configured in which the optical path-length difference between two waveguides adjacent to each other is constant. The first input-side slab waveguide 104 is connected to a light input end of the first arrayed waveguide 103. The first output-side slab waveguide 105 is connected to a light output end of the first arrayed waveguide 103. The first input waveguide 106 is connected to an input side of the first input-side slab waveguide 104. The first output waveguides 107 are provided in plural numbers and are connected to an output side of the first output-side slab waveguide 105.

The wavelength checker also includes a light conversion unit 102 made of a conversion material that converts infrared light into visible light. The light conversion unit 102 is disposed on output sides of the plurality of output waveguides 107 of the optical waveguide chip 101 to be capable of receiving light emitted from the plurality of output waveguides 1o7. The light conversion unit 102 is formed to extend in a direction in which the plurality of output waveguides 107 are arranged. The light conversion unit 102 extends, for example, from one end side to the other end side of the array of the plurality of output waveguides 107.

The conversion material is, for example, a phosphorescent substance or a fluorescent substance that converts near-infrared light into visible light. For example, the conversion material can be mixed with a thermosetting silicon resin and heated to be cured, thereby forming the light conversion unit 102. For example, Phosphor manufactured by "Lumitek International" can be used as the conversion material. For example, some conversion materials have sensitivity from 700 nm to 1700 nm.

According to the wavelength checker of Embodiment 1, when near-infrared light reaches the light conversion unit 102, visible light is generated, the near-infrared light being demultiplexed for each wavelength by the arrayed-waveguide diffraction grating and being guided through the first output waveguide 107 to be emitted from an output end 108. The generated visible light isotropically spreads without being limited to an incident direction of the near-infrared light emitted from the output end 108, and can be visually observed in various directions. Further, since the visible light is generated from the position where the emitted near-infrared light reaches, the first output waveguide 107 from which the near-infrared light is emitted can be specified from the position where the visible light is generated. Since the wavelength of the near-infrared light demultiplexed and guided to each of the first output waveguides 107 is known, the wavelength can be checked by checking of the position where the visible light is generated (visually observed).

Figure 2A:
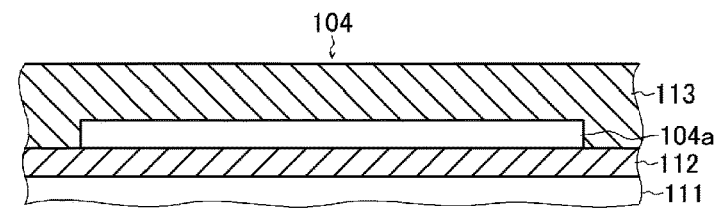
FIG. 2A is a cross-sectional view showing a partial configuration of the wavelength checker according to Embodiment 1 of the present invention.

Here, as shown in FIG. 2A, the first input-side slab waveguide 104 includes, for example, a lower clad layer 112 formed on an Si substrate in made of Si 112, a core portion 104a formed on the lower clad layer 112, and an upper clad layer 113 formed on the core portion 104a. FIG. 2A shows a cross section taken along a line aa' in FIG. 1. In FIG. 2A, a main board 151 formed below the Si substrate 111 is not presented.

Figure 2B:
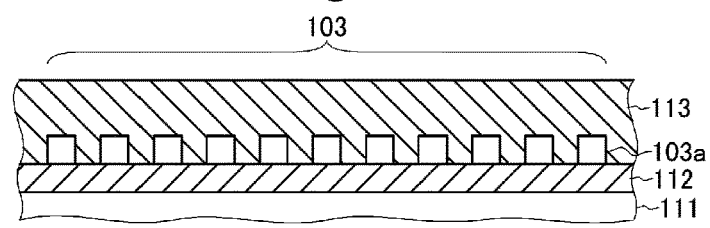
FIG. 2B is a cross-sectional view showing a partial configuration of the wavelength checker according to Embodiment 1 of the present invention.

In addition, as shown in FIG. 2B, the first arrayed waveguide 103 includes a lower clad layer 112 formed on an Si substrate 111, a plurality of core portions 103a formed on the lower clad layer 112, and an upper clad layer 113 formed on the plurality of core portions 103a. FIG. 2B shows a cross section taken along a line bb' in FIG. 1. For example, the Si substrate in is a silicon substrate, each of the clad layers is made of quartz glass, and the core portions 103a and 104a are made of quartz glass. In FIG. 2B, the main board 151 formed below the Si substrate 111 is not presented.

Figure 2C:
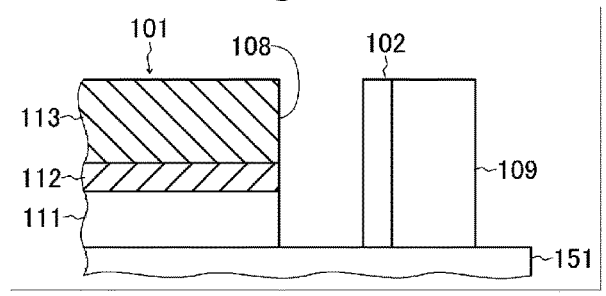
FIG. 2C is a cross-sectional view showing a partial configuration of the wavelength checker according to Embodiment 1 of the present invention.

Further, as shown in FIG. 2C, the light conversion unit 102 is formed on a side surface of the support 109 facing the output end surface 108 of the optical waveguide chip 101. The support 109 is fixed to the main board 151. FIG. 2C shows a cross section taken along a line cc' in FIG. 1.

The arrayed-waveguide diffraction grating will be described below in more detail. A case will be described below in which the first arrayed waveguide 103 includes eight waveguides and the number of first output waveguides 107 is eight (the number of waveguides being eleven in FIG. 1, but being many more in reality). Such an arrayed-waveguide diffraction grating splits the multiplexed light of eight wavelengths input to the first input waveguide 106 into eight outputs.

First, the multiplexed light input to the first input waveguide 106 are diffracted and spread by the first input-side slab waveguide 104, and are coupled and guided to the waveguides of the first arrayed waveguide 103, respectively. The first arrayed waveguide 103 has a long optical path length on an upper side (outer side) of a paper surface of FIG. 1 and a shorter optical path length at equal distances toward a lower side (inner side) of the paper surface of FIG. 1. At a terminal of the first arrayed waveguide 103, a phase difference from the outer waveguide to the inner waveguide of the first arrayed waveguide 103 occurs. Accordingly, when the light is incident to the first output-side slab waveguide 105, the inclination of a fan-shaped equiphase plane caused by the shape of the slab waveguide changes depending on the wavelength, and the light is collected (optically coupled) onto the corresponding first output waveguide 107 for each wavelength. As a result, according to the arrayed-waveguide diffraction grating, it is possible to split (demultiplex) the wavelength-multiplexed light for each wavelength.

Figure 3:
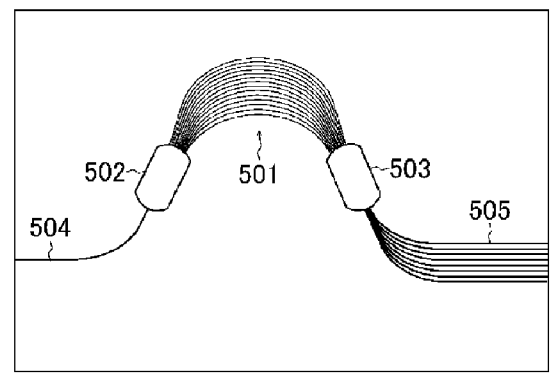
FIG. 3 is a plan view showing a configuration of an arrayed-waveguide diffraction grating.

In the arrayed-waveguide diffraction grating that is used in general, as shown in FIG. 3, an arrayed waveguide 501 is bent at one position in an arc shape in plan view. In FIG. 3, reference numeral 502 denotes an input-side slab waveguide, reference numeral 503 denotes an output-side slab waveguide, reference numeral 504 denotes an input waveguide, and reference numeral 505 denotes an output waveguide. On the other hand, in the arrayed-waveguide diffraction grating of the present embodiment, the first arrayed waveguide 103 is bent at a plurality of positions in plan view, for example, in a gull wing shape in plan view. A description will be given below in regard to this matter.

A description will be given below in detail with respect to the optical path length of each of the waveguides forming the first arrayed waveguide 103 in the arrayed-waveguide diffraction grating of the embodiment. When the optical path-length difference between the waveguides adjacent to each other in the first arrayed waveguide 103 is defined as $\Delta L$, a central wavelength $\lambda_o$ of the arrayed-waveguide diffraction grating is expressed by the following Formula (1). The central wavelength $\lambda_o$ is usually a central wavelength of transmittance of a center port of output ports of the arrayed-waveguide diffraction grating. In Formula (1), $n_c$ represents an effective index of the array waveguide, and m represents an order of diffraction.

In this example, from the upper side of the paper surface of FIG. 1, the output end of the first output waveguide 107 located at the uppermost stage is defined as a port 1, the output end of the first output waveguide 107 located at the second stage is defined as a port 2, the output end of the first output waveguide 107 located at the third stage is defined as a port 3, the output end of the first output waveguide 107 located at the fourth stage is defined as a port 4, the output end of the first output waveguide 107 located at the fifth stage is defined as a port 5, the output end of the first output waveguide 107 located at the sixth stage is defined as a port 6, the output end of the first output waveguide 107 located at the seventh stage is defined as a port 7, and the output end of the first output waveguide 107 located at the eighth stage is defined as a port 8.

Formula 1

$$\lambda_0 = \frac{n_c \Delta L}{m} \quad (1)$$

In addition, a free spectral range (FSR) of the arrayed waveguide diffraction grating is expressed by the following Formula (2).

Formula 2

$$FSR \cong \frac{\lambda_0}{m} \quad (2)$$

Formulas (1) and (2) are referred to in Non-Patent Literatures 2 and 3.

For example, when a free spectral range (FSR) is designed in which the arrayed-waveguide diffraction grating is 400 nm or more of wavelengths from 1250 nm to 1650 nm, the central wavelength $\lambda_o$ is 1450 nm, the wavelength interval is 50 nm, and the first output waveguides 107 are eight in number, the whole wavelength range of the PON system-based access system can be covered. In this case, since the central wavelength of FSR is 1450 nm, the order of diffraction m may be set to any one of 1 to 3 from Formula (2).

Here, from Formula (1), the optical path-length difference λL becomes a minute length in an order of μm, which cannot be realized with the arc structure in which the first arrayed waveguide 103 is bent at only one position. For this reason, the embodiment has a structure in which the first arrayed waveguide 103 is bent at a plurality of positions of a central portion and both side portions in plan view. As described above, since the plurality of bent positions are provided, it is possible to reverse the change of the optical path length from the upper side (outer side) of the paper surface of FIG. 1 to the lower side (inner side) of the paper surface of FIG. 1 at different bent positions of the first arrayed waveguide 103.

For example, the first arrayed waveguide 103 is bent to protrude outward in plan view at the central portion, and is bent to protrude inward in plan view at the both side portions sandwiching the central portion. With such a configuration, the optical path length increases toward the outer side (the upper side of the paper surface of FIG. 1) at the central portion of the first arrayed waveguide 103, but the optical path length reduces toward the outer side at the both side portions. The optical path-length difference between the waveguides adjacent to each other at the central portion of the first arrayed waveguide 103 is set to be different from the optical path-length difference between the waveguides adjacent to each other at the both side portions, so that the changes in the optical path length at the central portion and the both side portions are canceled each other to some extent and the optical path-length difference can be set with a minute length in the entire first arrayed waveguide 103. The detailed design of the optical path-length difference described above is disclosed in Patent Literature 1.

Figure 4:
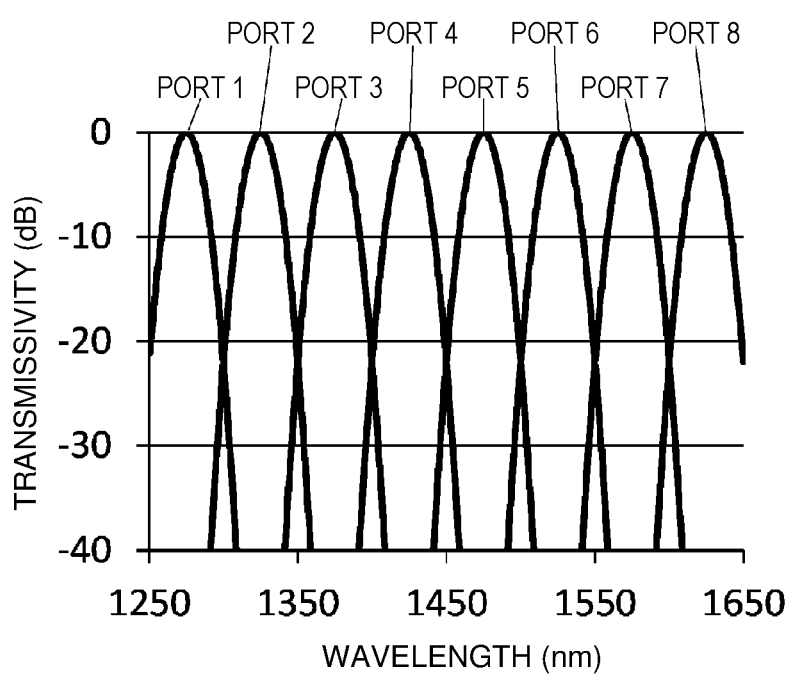
FIG. 4 is a characteristic diagram showing a calculation result of a transmittance spectrum of the arrayed-waveguide diffraction grating in an optical waveguide chip 101.

A transmittance spectrum function of the arrayed-waveguide diffraction grating (optical waveguide chip 101) is represented by a Gauss function. A result example of calculation is shown in FIG. 4. The central wavelength of transmittance of the output port 1 is 1275 nm. The central wavelength of transmittance of the output port 2 is 1325 nm. The central wavelength of transmittance of the output port 3 is 1375 nm. The central wavelength of transmittance of the output port 4 is 1425 nm. The central wavelength of transmittance of the output port 5 is 1475 nm. The central wavelength of transmittance of the output port 6 is 1525 nm. The central wavelength of transmittance of the output port 7 is 1575 nm. The central wavelength of transmittance of the output port 8 is 1625 nm.

The transmittance spectrum function will be described. The transmittance function of the arrayed-waveguide diffraction grating can be expressed by Formula (3) when the loss is ignored (see Non-Patent Literature 3).

Formula 3

$$T(\delta f) = \exp\left\{-\left(\frac{\Delta \times \delta f}{\omega_0 \Delta f}\right)^2\right\} \quad (3)$$

In Formula (3), a symbol δλ indicates a deviation from a central frequency of transmittance, a symbol Δλ indicates an interval between center positions of the first output waveguides 107 connected to the first output-side slab waveguide 105, a symbol λf indicates a central frequency interval between channels adjacent to each other, and a symbol $\omega_o$ indicates a spot size.

Here, when a symbol δλ is defined as a deviation from the central wavelength of transmittance and a symbol Δλ is defined as a central wavelength interval between channels adjacent to each other, the following Formula (4) is established, and Formula (5) can be obtained by substitution of Formula (4) into Formula (3). Formula (3) represented in a frequency domain is represented in a wavelength domain by Formula (5).

Formula 4

$$\frac{\delta \lambda}{\Delta \lambda} = \frac{\delta f}{\Delta f} \quad (4)$$

$$T(\delta \lambda) \cong \exp\left\{-\left(\frac{\Delta \times \delta \lambda}{\omega_0 \Delta \lambda}\right)^2\right\} \quad (5)$$

FIG. 4 shows a result obtained by calculating the transmittance spectrum of each channel of the arrayed-waveguide diffraction grating using Formula (5). A parameter $\Delta x/\omega_o$ representing steepness of the Gauss function can be adjusted at the time of the design of the arrayed-waveguide diffraction grating, and the parameter $\Delta x/\omega_o$ is set to 4.5 in the embodiment.

By the way, since the wavelength domain is as wide as 1250 nm to 1650 nm, a loss occurs around 1380 nm in the arrayed-waveguide diffraction grating, which is designed in such a way, due to absorption of OH groups existing in the quartz glass forming the waveguide. However, since such a wavelength band is not used for transmission, operation characteristics of the arrayed-waveguide diffraction grating are not affected by the wavelength band. The calculation result shown in FIG. 4 does not consider the calculation regarding the absorption of the OH groups existing in the quartz glass forming the waveguide.

In addition, although the above-described arrayed-waveguide diffraction grating has a channel interval of 50 nm, a temperature dependency of the demultiplexed wavelength of an interference filter using the quartz-based waveguide 0.01 nm/° C. Even when a temperature change in indoor/outdoor use environment is 40° C. from −5° C. to 35° C., the wavelength variation corresponds to about 0.4 m due to the temperature dependency described above, which is ¹/₁₀₀ or less of the interval between the channels adjacent to each other, and does not affect demultiplexing characteristics. Accordingly, when the arrayed-waveguide diffraction grating described above is actually used, it is not necessary to control the temperature using a Peltier device.

In the quartz-based waveguide, TE/TM polarization dependency of the transmittance spectrum is about 0.1 to 0.2 nm. However, since the interval (=resolution) between the channels adjacent to each other in the arrayed-waveguide diffraction grating is as large as 50 nm, the polarization dependency can be ignored.

Embodiment 2

Figure 5A:
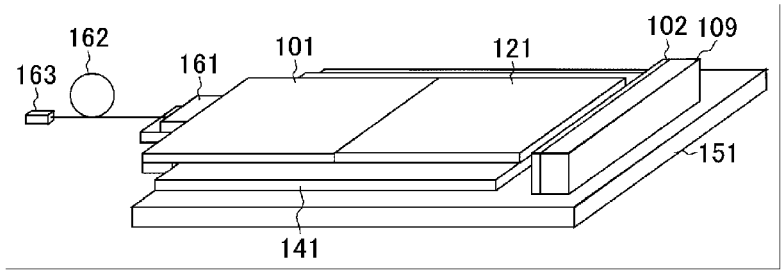
FIG. 5A is a perspective view showing a configuration of a wavelength checker according to Embodiment 2 of the present invention.
Figure 5B:
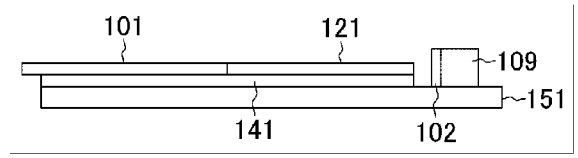
FIG. 5B is a side view showing a partial configuration of the wavelength checker according to Embodiment 2 of the present invention.
Figure 5C:
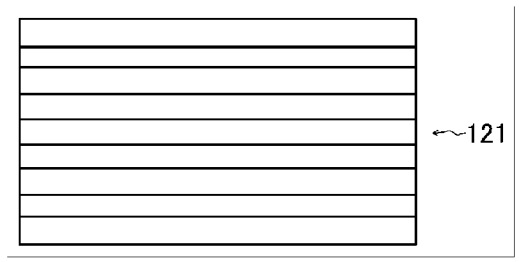
FIG. 5C is a plan view showing a partial configuration of the wavelength checker according to Embodiment 2 of the present invention.

A wavelength checker according to Embodiment 2 of the present invention will be described below with reference to FIGS. 5A, 5B, and 5C.

The wavelength checker includes an optical waveguide chip 101. The optical waveguide chip 101 is similar to that of the Embodiment 1 described above. In addition, the wavelength checker includes an optical waveguide chip 121 which is arranged side by side with the optical waveguide chip 101 and includes optical waveguides configured to guide emitted light. The optical waveguide chip 121 is formed with a plurality of linear optical waveguides. For example, eight linear optical waveguides are formed in the optical waveguide chip 121 corresponding to the eight output waveguides of the optical waveguide chip 101. In addition, the eight linear optical waveguides are arranged at intervals of 1 mm that are equal to the intervals of the output ends of the eight output waveguides of the optical waveguide chip 101.

In Embodiment 2, the surface of the light conversion unit 102 to be irradiated with the emitted light is arranged to face the output end of the optical waveguide chip 121 through which the emitted light is output to the outside. The light conversion unit 102 is similar to that of Embodiment 1. Further, the optical waveguide chip 121 is arranged side by side in series with the optical waveguide chip 101 in a waveguide direction.

In Embodiment 2, the optical waveguide chip 101 and the optical waveguide chip 121 are mounted on an optical waveguide chip 141, that is, are laminated in two layers. The lower optical waveguide chip is defined as a parent optical waveguide chip, and the upper optical waveguide chip is defined as a child optical waveguide chip. Therefore, in the following description, the optical waveguide chips are called the child optical waveguide chip 101, the child optical waveguide chip 121, and the parent optical waveguide chip 141. The parent optical waveguide chip 141 may include a planar lightwave circuit or may include no optical circuit (only clad glass being formed on an Si substrate). Each of the child optical waveguide chip 101 and the optical waveguide chip 121 is mounted on the parent optical waveguide chip 141 via a spacer (not shown) such that a surface (formed with the clad glass) formed with the optical waveguide (planar lightwave circuit) faces the parent optical waveguide chip 141 (a surface on which the clad glass is formed). Here, the optical waveguide chip configured to try to transmit light is the child optical waveguide chip. When the surface formed with the clad glass is taken as a front surface, a back surface formed with the Si substrate can be seen when the child waveguide chip is viewed from above. In other words, the optical circuit including a core and a clad in the child optical waveguide chip is arranged on the lower side. Further, the parent optical waveguide chip 141 is mounted on a main board 151. For example, the parent optical waveguide chip 141 is bonded and fixed on the main board 151 with an adhesive. The child optical waveguide chips 101 and 121 are arranged in a column in an incident direction of light.

The light conversion unit 102 is supported by a support 109 fixed on the main board 151. For example, a side surface of the support 109 facing the output end surface of the child optical waveguide chip 121 is coated with a conversion material that converts infrared light into visible light, thereby forming a light conversion unit 102.

A fiber block 161 is connected to an input waveguide end of the child optical waveguide chip 101. An optical fiber 162 provided with a connector 163 is connected to the fiber block 161, the connector being configured to input an optical signal to be checked. A connector-attached optical fiber (not shown) is separately used for aligning the fiber block 161 and the input waveguide of the child optical waveguide chip 101. In addition, the child optical waveguide chip 101 is bonded and fixed to the parent optical waveguide chip 141 with an adhesive via a spacer (not shown). On the other hand, the child optical waveguide chip 121 is detachably attached to the parent optical waveguide chip 141 in a semi-fixed state, and thus can be replaced.

Figure 6A:
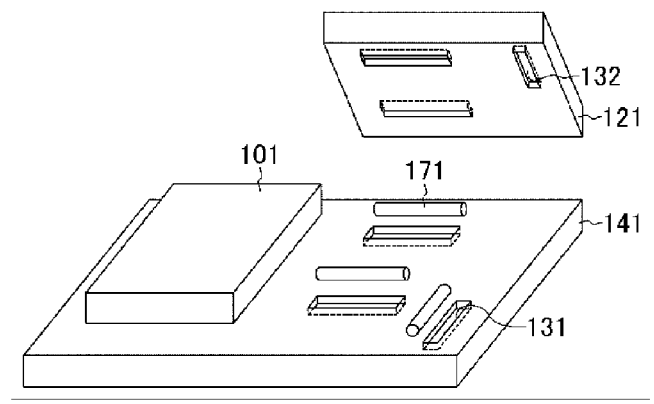
FIG. 6A is a perspective view showing a partial configuration of the wavelength checker according to Embodiment 2 of the present invention.
Figure 6B:
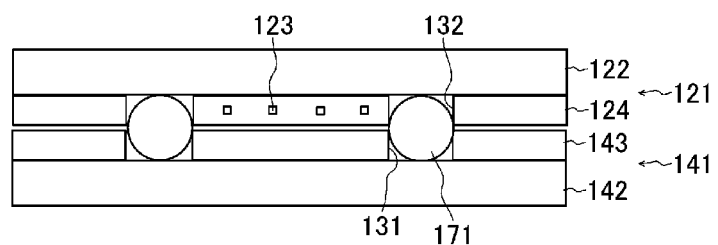
FIG. 6B is a cross-sectional view showing a partial configuration of the wavelength checker according to Embodiment 2 of the present invention.

Positioning of the child optical waveguide chip 101 and child optical waveguide chip 121 on the parent optical waveguide chip 141 will be described below with reference to FIGS. 6A and 6B. First, a plurality of first grooves 131 are formed in the parent optical waveguide chip 141, and a second groove 132 is formed in each of the child optical waveguide chip 101 and the child optical waveguide chip 121. Each of the plurality of first grooves 131 is fitted with a part of a plurality of spacer members 171 protruding from the parent optical waveguide chip 141. In addition, each of the second groove 132 of the child optical waveguide chip 101 and the second groove 132 of the child optical waveguide chip 121 is also fitted with a protruding portion of any one of the plurality of spacer members 171. The second groove 132 is located to avoid the waveguide portion (core) of the child optical waveguide chip 101 and the child optical waveguide chip 121. The number of grooves may be usually three or more.

The first groove 131 is formed in a clad layer 143 of the parent optical waveguide chip 141. The first groove 131 is formed to penetrates the clad layer 143 and reach a substrate 142. Similarly, the second groove 132 is formed in a clad layer 124 including a core 123 of the child optical waveguide chip 121. The second groove 132 is formed to penetrate the clad layer 124 and reach a substrate 122.

The first groove 131 and the second groove 132 can be formed by known photolithography technique and an etching technique (reactive ion etching). Using a mask pattern formed by the photolithography technique as a mask, the clad layer 143 is subjected to etching using the substrate 142 as an etching stop layer, thereby forming the first groove 131. Similarly, using a mask pattern formed by the photolithography technique as a mask, the clad layer 124 is subjected to etching using the substrate 122 as an etching stop layer, thereby forming the second groove 132.

Positional accuracy (shift amount) in a plane direction of the first groove 131 and the second groove 132 thus formed with respect to the design is determined by positional accuracy of the mask pattern and the positional shift amount during the etching. As is well known, the positional accuracy of the mask pattern is on a submicron order or less, and the positional shift in the reactive ion etching is also on a submicron order or less. Accordingly, the positional shift in the direction of the plane where the first groove 131 and the second groove 132 are formed is to be 1 μm or less with respect to the design.

Further, a depth of the first groove 131 is determined by a thickness of the clad layer 143, and a depth of the second groove 132 is determined by a thickness of the clad layer 124. Thickness accuracy of the clad layer 143 and thickness accuracy of the clad layer 124 are determined in a submicron order by a well-known glass deposition technique, for example. The same applies to the position in a thickness direction of the core 123 embedded in the clad layer 124.

Here, the spacer members 171 can be formed, for example, by cutting an optical fiber into a predetermined length, and accuracy of a diameter of each of the spacer members 171 can be determined in a submicron order. Accordingly, the positional accuracy in the thickness direction of the child optical waveguide chip 121 is also determined within 1 μm.

From the above, the child optical waveguide chip 101 and the child optical waveguide chip 121 mounted on the parent optical waveguide chip 141 can accurately align positions of the core centers of the corresponding optical waveguides. Generally, positioning between the plurality of child chips mounted on the parent optical chip described above is performed under a condition that no bending occurs in each chip. More detailed description refers to Patent Literature 2, Non-Patent Literature 4, and Non-Patent Literature 5. Such optical mounting is called PPCP (Pluggable Photonic Circuit Platform). The child optical waveguide chip 121 mounted by PPCP is characterized by being detachably attached. For this reason, the child optical waveguide chips 121 having various functions can be replaced, and various functions can be flexibly provided. So to speak, the PPCP has characteristics of an optical circuit (optical chip) version of an electronic block.

Manufacturing the child optical waveguide chip 121 will be described below with reference to FIGS. 7A to 7E.

Figure 7A:
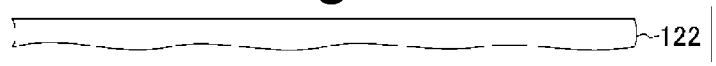
FIG. 7A is a cross-sectional view for explaining a method of manufacturing a child optical waveguide chip forming the wavelength checker according to Embodiment 2 of the present invention.
Figure 7B:
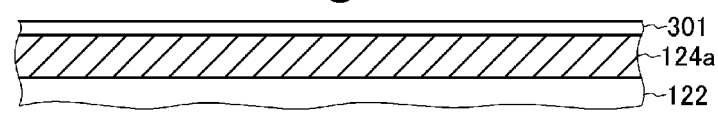
FIG. 7B is a cross-sectional view for explaining a method of manufacturing the child optical waveguide chip forming the wavelength checker according to Embodiment 2 of the present invention.

First, as shown in FIG. 7A, the substrate 122 made of Si is prepared. Next, as shown in FIG. 7B, a lower clad layer 124a is formed on the substrate 122, and a core formation layer 301 is formed on the lower clad layer 124a.

For example, the lower clad layer 124a and the core formation layer 301 can be formed by a flame hydrolysis deposition (FHD) method. First, a raw material gas (main component: silicon tetrachloride) passes through an oxyhydrogen flame to deposit heated-hydrolyzed glass particles on the substrate 122, thereby forming a first particle layer to be the lower clad layer 124a. Subsequently, glass particles having different compositions are deposited on the first particle layer by change of the composition of the raw material gas (change of $GeO_2$ dopant concentration) to form a second particle layer to be the core formation layer 301. Thereafter, for example, the first particle layer and the second particle layer are heated using an electronic furnace to form transparent glass composition films, respectively, which are the lower clad layer 124a and the core formation layer 301. These layers can also be formed by a chemical vapor deposition method.

Figure 7C:
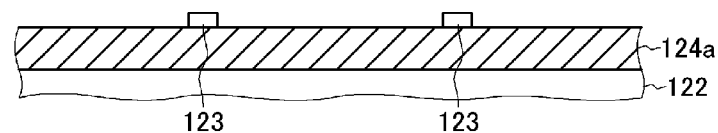
FIG. 7C is a cross-sectional view for explaining a method of manufacturing the child optical waveguide chip forming the wavelength checker according to Embodiment 2 of the present invention.

Then, the core formation layer 301 is subjected to patterning using a known lithography technique and etching technique used for manufacturing a semiconductor device, thereby forming a core 123 as shown in FIG. 7C. For example, a resist pattern is formed on a portion to be the core 123 on the core formation layer 301 by a photolithography technique. Next, using the formed resist pattern as a mask, the core formation layer 301 is etched by reactive ion etching (RIE) to leave the portion to be core 123 and remove the remaining core formation layer. Then, the resist pattern is removed, and thus the core 123 can be formed.

Figure 7D:
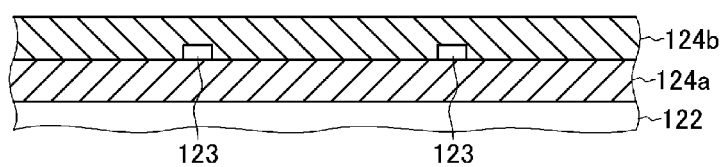
FIG. 7D is a cross-sectional view for explaining a method of manufacturing the child optical waveguide chip forming the wavelength checker according to Embodiment 2 of the present invention.

Next, as shown in FIG. 7D, an upper clad layer 124b is formed on the core 123. Similarly to the lower clad layer 124a described above, the upper clad layer 124b can be formed by the FHD method.

Figure 7E:
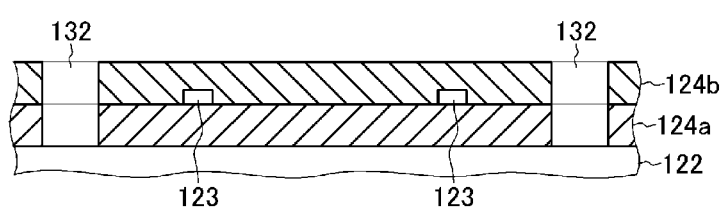
FIG. 7E is a cross-sectional view for explaining a method of manufacturing the child optical waveguide chip forming the wavelength checker according to Embodiment 2 of the present invention.

Subsequently, the upper clad layer 124b and the lower clad layer 124a are subjected to patterning by a known lithography technique and etching technique, and thus the second groove 132 is formed to penetrate the upper clad layer 124b and the lower clad layer 124a and reach the substrate 122 as shown in FIG. 7E. For example, a resist pattern having an opening at positions where the second grooves 132 are formed is formed on the upper clad layer 124b by a photolithography technique. Next, using the formed resist pattern as a mask, the upper clad layer 124b and the lower clad layer 124a are etched by RIE to remove portions to be the second groove 132. Then, the resist pattern is removed, and thus the second groove 132 can be formed.

Figure 8:
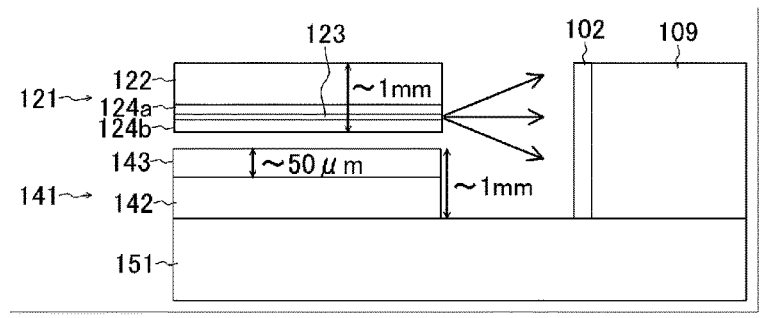
FIG. 8 is a cross-sectional view showing a configuration in the vicinity of a light conversion unit of the wavelength checker according to Embodiment 2 of the present invention.

FIG. 8 shows an enlarged cross section of an emission portion of the child optical waveguide chip 121. For example, it is assumed that light is guided in the optical waveguide with a mode field diameter (MFD) of 6 μm (=sport size of 3 μm). The mode field diameter roughly corresponds to, for example, a mode field diameter realized by an optical waveguide in which a cross-sectional dimension of the core is 4.5 μm×4.5 μm (rectangle) and a relative refractive index difference between the core and the clad is 1.5%. The spot size is half of the MFD.

When light having the MFD of 6 μm is emitted from the end surface, the beam spreads by diffraction. Hereinafter, the beam spread is calculated by approximating an electric field distribution in the optical waveguide as a Gauss distribution. Assuming that the spot size at the emission end is $\omega_o$, a beam diameter after propagating a distance z from the emission end surface is expressed by Formula (6). Such a beam diameter is described in detail in Non-Patent Literature 6. In Formula (6), a symbol λ indicates a wavelength. Formula (6) can be approximated by Formula (7) under a condition that a square term in a root (√) of Formula (6) becomes sufficiently larger than 1 (in this case, z>100 μm approximately).

Formula 5

$$\omega(z) = \omega_0 \sqrt{1 + \left(\frac{\lambda z}{\pi \omega_0^2}\right)^2} \quad (6)$$

$$\omega(z) \cong \omega_0 \left(\frac{\lambda z}{\pi \omega_0^2}\right) \quad (7)$$

Figure 9:
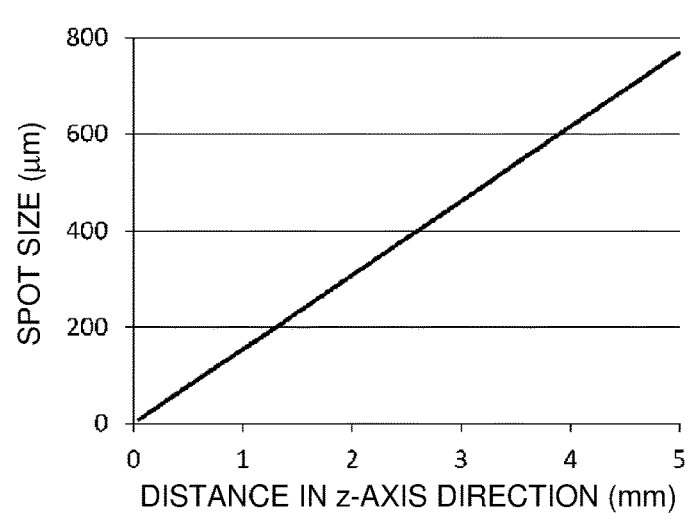
FIG. 9 is a characteristic diagram obtained by plotting Formula (7).

FIG. 9 shows a plot of Formula (7). It can be seen that an accurate value can be obtained from z=1 mm which is a range to be considered. From FIG. 9, the spot size becomes 500 mμm when propagation of a distance of about 3.5 mm occurs, and the MFD becomes 1 mm which is the same as the optical waveguide pitch (the spot size being half of the MFD). It can be seen that, when the light conversion unit 102 (support 109) is separated from the emission end of the child optical waveguide chip 121 from this distance, it becomes difficult to distinguish it from the emission light (light converted into visible light) from the adjacent channel.

Here, since the upper clad layer 124b of the child optical waveguide chip 121 is thin (30 μm or less) and the clad layer 143 of the parent optical waveguide chip 141 is thin (up to 50 μm), when the end surface on the emission side of the child optical waveguide chip 121 is farther from the light conversion unit 102 than the end surface on the side of the light conversion unit 102 of the parent optical waveguide chip 141, the light emitted from the child optical waveguide chip 121 enters the clad layer 143 and the substrate 142 of the parent optical waveguide chip 141 and is refracted. Thus, the shape of the beam to be irradiated to the light conversion unit 102 is deformed and is difficult to be recognized. Since the refractive index of Si forming the substrate being 3.5 is larger than the refractive index of the quartz glass forming the clad being 1.4 to 1.5 compared with the refractive index of air being 1, a refraction angle is also further increased.

Therefore, it is important that the end surface on the emission side (the side of the light conversion unit 102) of the child optical waveguide chip 121 is located on the side of the light conversion unit 102 at the same position as the end surface on the side of the light conversion unit 102 of the parent optical waveguide chip 141, or is arranged closer to the light conversion unit 102 than the end surface on the side of the light conversion unit 102 of the parent optical waveguide chip 141.

In the wavelength checker according to Embodiment 2 described with reference to FIGS. 5A, 5B, and 5C, the transmittance spectrum of the child optical waveguide chip 121 is also similar to that of Embodiment 1, and the spectrum shown in FIG. 4 can also be obtained.

Figure 10:
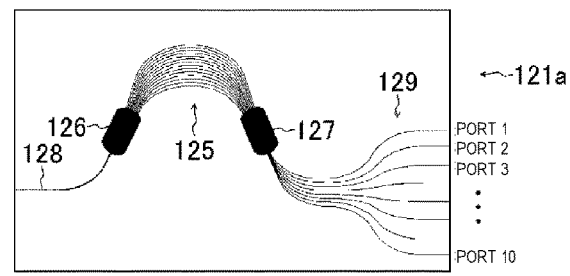
FIG. 10 is a plan view showing a partial configuration of another wavelength checker according to Embodiment 2 of the present invention.

Alternatively, as shown in FIG. 10, the child optical waveguide chip 121 can be replaced with a child optical waveguide chip 121a including an arrayed-waveguide diffraction grating. The child optical waveguide chip 121a includes an arrayed-waveguide diffraction grating having a narrow demultiplexing wavelength interval. In FIG. 10, reference numeral 125 denotes a second array waveguide, reference numeral 126 denotes a second input-side slab waveguide, reference numeral 127 denotes a second output-side slab waveguide, reference numeral 128 denotes a second input waveguide, and reference numeral 129 denotes a second output waveguide. Such a configuration is applied to a normal arrayed-waveguide diffraction grating in which the second array waveguide 125 has an arc shape in plan view. A 10-port arrayed-waveguide diffraction grating is shown in which a demultiplexing wavelength is from 1550 nm to 1600 nm and a demultiplexing wavelength interval is 5 nm. In FIG. 10, a part of the second output waveguide 129 is not shown.

Figure 11:
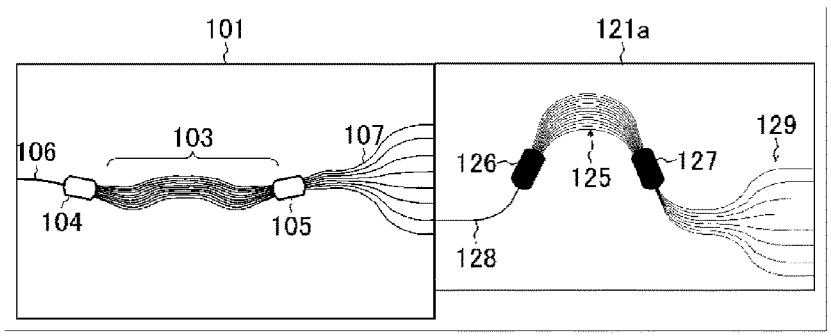
FIG. 11 is a plan view showing a partial configuration of another wavelength checker according to Embodiment 2 of the present invention.
Figure 12:
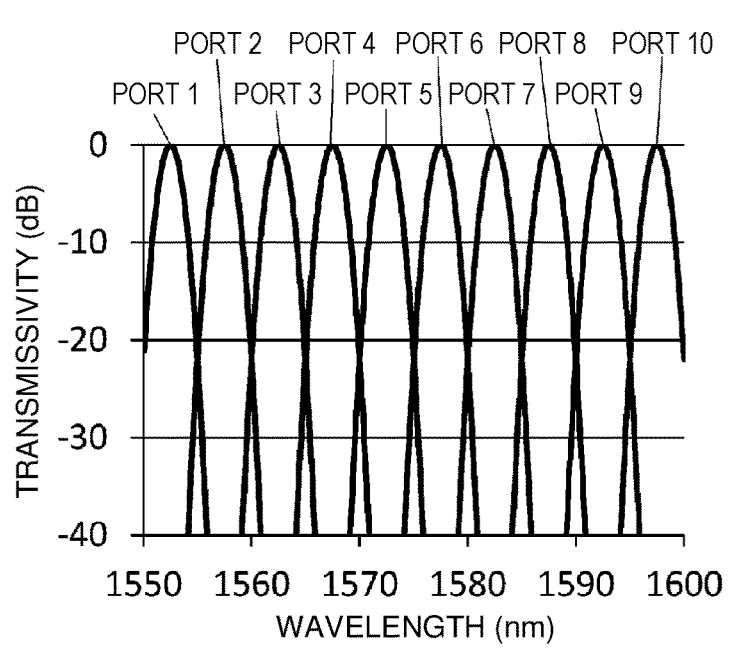
Figure 13:
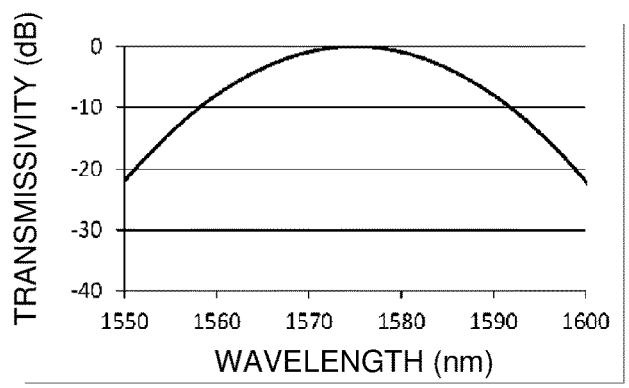
FIG. 13 is a characteristic diagram showing a calculation result of a transmittance spectrum of an arrayed-waveguide diffraction grating of an optical waveguide chip 101.
Figure 14:
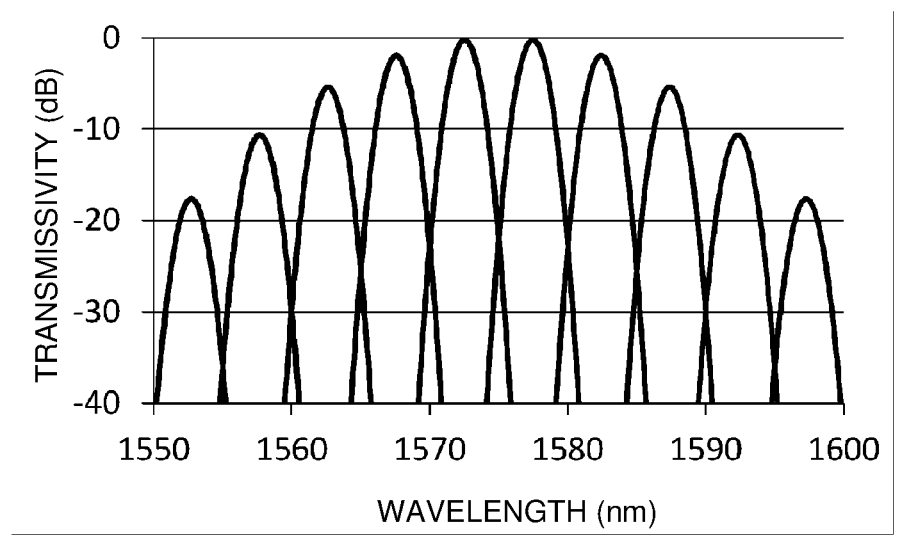
FIG. 14 is a characteristic diagram showing a spectrum obtained by a combination of the spectrum shown in FIG. 12 and the spectrum shown in FIG. 13.

FIG. 11 shows a connection state between the child optical waveguide chip 101 and the child optical waveguide chip 121a. As shown in FIG. 11, a case will be described in which the second input waveguide 128 of the child optical waveguide chip 121a is optically connected to port 7 of a first output waveguide 107 of the child optical waveguide chip 101. FIG. 12 shows a transmittance wavelength spectrum of the arrayed-waveguide diffraction grating of the child optical waveguide chip 121 (the demultiplexing wavelength interval being narrow) in this case. Such a spectrum is calculated using Formula (5). On the other hand, the transmittance spectrum of the arrayed-waveguide diffraction grating of the child optical waveguide chip 101 becomes a broad spectrum as shown in FIG. 13. The transmittance spectrum in the connection configuration between the child optical waveguide chip 101 and the child optical waveguide chip 121a is a combination of the spectrum shown in FIG. 12 and the spectrum shown in FIG. 13, and thus a spectrum is obtained as shown in FIG. 14.

The transmittance spectrum in the case where the child optical waveguide chip 101 is combined with the child optical waveguide chip 121 including the linear optical waveguide is as shown in FIG. 4, and the wavelength resolution is 50 nm. On the other hand, in the transmittance spectrum when the child optical waveguide chip 101 is combined with the child optical waveguide chip 121a including the arrayed-waveguide diffraction grating, the wavelength resolution is 5 nm, and the wavelength can be checked with higher accuracy.

In the configuration in which the child optical waveguide chip 101 is combined with the child optical waveguide chip 121, the measurement range is as wide as 400 nm from 1250 nm to 1650 nm as shown in FIG. 4. On the other hand, in the configuration in which the child optical waveguide chip 101 is combined with the child optical waveguide chip 121a, the measurement range becomes narrow as shown in FIG. 14.

As described above, the child optical waveguide chip 121 and the child optical waveguide chip 121a are replaceable by PPCP mounting, and thus the wavelength resolution and the measurement range of the wavelength checker can be flexibly changed.

In the above description, the wavelength is checked more accurately using the arrayed-waveguide diffraction grating with a narrow wavelength interval in the wavelength domain of wavelengths from 1550 nm to 1600 nm. However, when an arrayed-waveguide diffraction grating of 10 ports with 5 nm intervals corresponding to the wavelength range output therefrom is prepared and is connected to another output port of the arrayed-waveguide diffraction grating of the child optical waveguide chip 101, it can be seen that the wavelength can also be checked with a wavelength resolution of 5 nm in another wavelength range.

The arrayed-waveguide diffraction grating having a narrow demultiplexing wavelength interval will be additionally described below. The free spectral range (FSR) equal to a channel interval×the number of channels is called a cyclic arrayed-waveguide diffraction grating (circular arrayed-waveguide diffraction grating). When the circular arrayed-waveguide diffraction grating is used as the arrayed-waveguide diffraction grating having the narrow wavelength interval, the optical chip connected to the child optical waveguide chip 101 can be shared by the same circular arrayed-waveguide diffraction grating. However, in channels with wavelengths that are too distant from each other, such as 1500 nm-band and 1300 nm-band, since the refractive index difference becomes large due to the influence of the refractive index dispersion, the arrayed-waveguide diffraction grating cannot be shared.

Although the device structure of the wavelength checker has been described above, a slight supplement will be given here from the viewpoint of a wavelength verification method. As a wavelength verification method of the PON system-based access system, an verification method can also be proposed in which wavelength are demultiplexed by the arrayed-waveguide diffraction grating for each wavelength, a material (wavelength conversion material) that converts near-infrared light into visible light is irradiated, and the wavelength is visually observed from a shining port. Since the arrayed-waveguide diffraction grating is broadly interpreted as a diffraction grating, an verification method can also be proposed in which the wavelength is demultiplexed by the diffraction grating for each wavelength, the wavelength conversion material is irradiated, and the wavelength is visually observed from a shining position. These verification methods have characteristics that the wavelength can be easily verified without using a power source.

Embodiment 3

Figure 15:
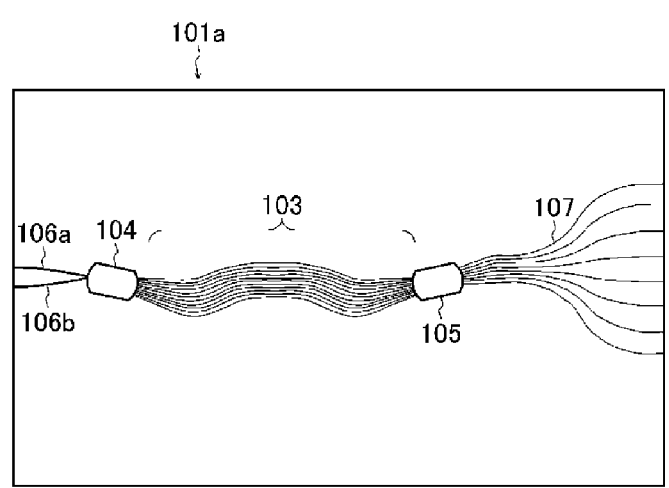
FIG. 15 is a plan view showing a partial configuration of a wavelength checker according to Embodiment 3 of the present invention.

A wavelength checker according to Embodiment 3 of the present invention will be described below with reference to FIG. 15. In Embodiment 3, a child optical waveguide chip 101a shown in FIG. 15 is used instead of the child optical waveguide chip 101 in the wavelength checker described with reference to FIGS. 5A, 5B, and 5C. In the child optical waveguide chip 101a, a main first input waveguide 106a and a sub first input waveguide 106b are connected to an input side of a first input-side slab waveguide 104. Other components are similar to those of the child optical waveguide chip 101.

Here, when a waveguide interval at a connection portion of a plurality of first output waveguides 107 with a first output-side slab waveguide 105 is defined as $\Delta x_{out}$, a waveguide interval between a connection portion of the main first input waveguide 106a with the first input-side slab waveguide 104 and a connection portion of the sub first input waveguide 106b with the first input-side slab waveguide 104 is set to $\Delta x_{out}/2$. In the child optical waveguide chip 101a, the first input-side slab waveguide 104, the first arrayed waveguide 103, and the first output-side slab waveguide 105 are formed in plan view to pass through a midpoint of a line segment connecting a center of the first input-side slab waveguide 104 and a center of the first output-side slab waveguide 105 and to be line-symmetrical about a straight line perpendicular to the line segment. The first input-side slab waveguide 104 has an arc having the same curvature on the side in contact with the input waveguide and the side in contact with the array waveguide. Therefore, the center of the input-side slab waveguide is an intersection between a straight line that forms an outer shape of the slab waveguide and a straight line diagonally connecting four points where the arc crosses. The same also applies to the first output-side slab waveguide 105.

The details will be described below.

Figure 16A:
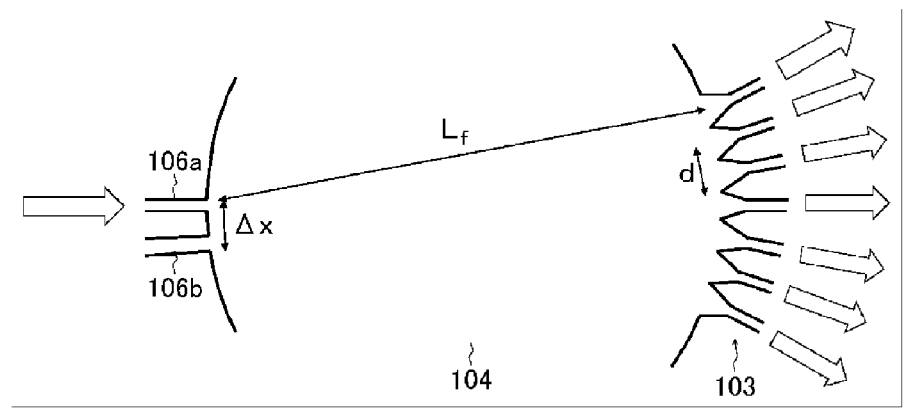
FIG. 16A is a plan view showing a partial configuration of the wavelength checker according to Embodiment 3 of the present invention.
Figure 16B:
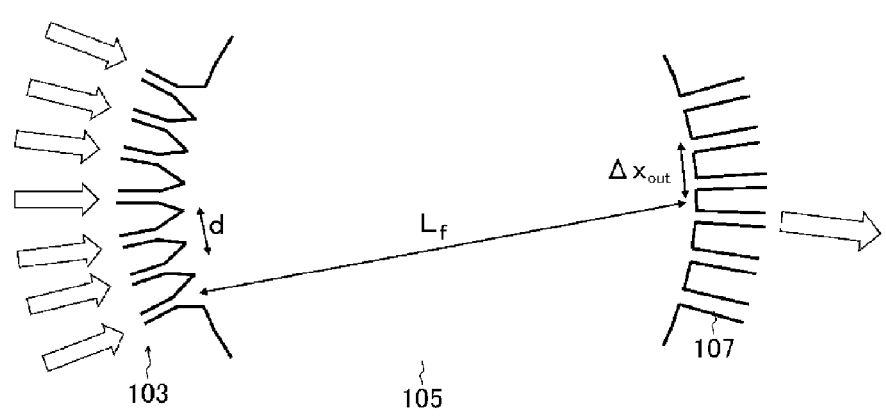
FIG. 16B is a plan view showing a partial configuration of the wavelength checker according to Embodiment 3 of the present invention.

The main first input waveguide 106a is connected to the center of the first input-side slab waveguide 104. Further, each of the first output waveguides 107 is connected to the center of the first output-side slab waveguide 105 with the waveguide interval $\Delta x_{out}$, and central wavelengths of transmittance to the first output waveguides 107 are assumed to be $\lambda 1$, $\lambda 2$, $\lambda 3$, ..., and $\lambda 8$ which are split at equal wavelength intervals. In addition, the sub first input waveguide 106b is connected to the first input-side slab waveguide 104 at a waveguide interval $\Delta x = \Delta x_{out}$ with respect to the main first input waveguide 106a (see FIGS. 16A and 16B).

As described above, when the first input-side slab waveguide 104, the first arrayed waveguide 103, the first output-side slab waveguide 105 are line-symmetrical in plan view (see Non-Patent Literature 2), the following description is established.

When the sub first input waveguide 106b is shifted and connected to the main first input waveguide 106a, the central wavelengths of transmittance to the first output waveguides 107 of wavelength-multiplexed light input to the sub first input waveguide 106b are split into $\lambda 2$, $\lambda 3$, $\lambda 4$, ..., and $\lambda 9$ at equal wavelength intervals. This is because the sub first input waveguide 106b is shifted by one, so the wavefront when reaching the first arrayed waveguide 103 is inclined, and as a result, the wavefront when reaching the first output waveguide 107 is inclined. Similarly, this is because the wavelength is focused on the first output waveguide 107 which is shifted by one.

When the waveguide interval between the main first input waveguide 106a and the sub first input waveguide 106b is defined as $\Delta x = \Delta x_{out}/2$, the central wavelengths of transmittance are $\lambda 1 + \Delta \lambda/2$, $\lambda 2 + \Delta \lambda/2$, $\lambda 3 + \Delta \lambda/2$, ..., and $\lambda 8 + \Delta \lambda/2$ with the central wavelength interval between adjacent channels being $\Delta \lambda$. Note that $\Delta \lambda = \lambda 2 - \lambda 1 = \lambda 3 - \lambda 2 = \ldots = \lambda 9 - \lambda 8$.

Figure 17A:
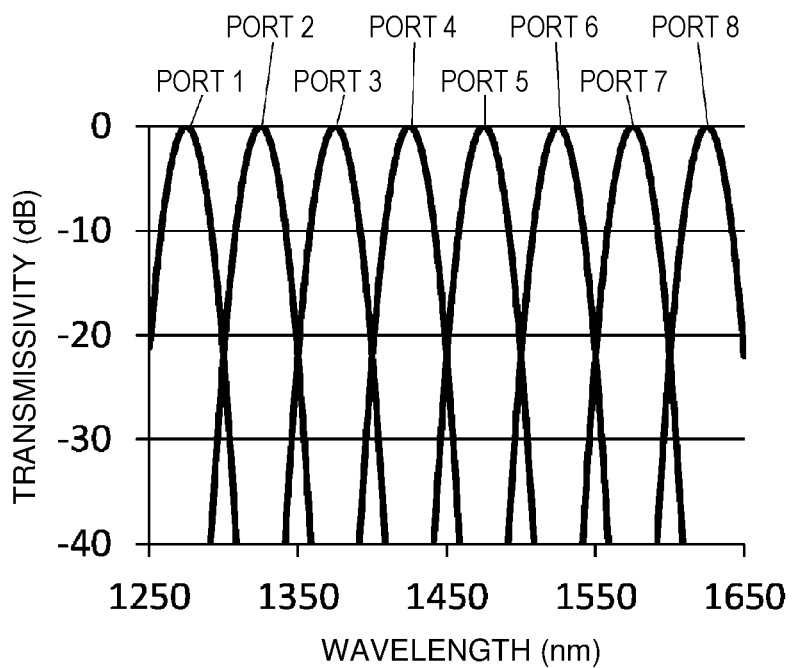
FIG. 17A is a characteristic diagram showing a calculation result of a spectrum which is input from a main input waveguide 106a of an optical waveguide chip 101a and is transmitted through an arrayed-waveguide diffraction grating.

When the design of the arrayed-waveguide diffraction grating in the child optical waveguide chip 101a is made the same as that of the child optical waveguide chip 101, the spectrum (calculated value) input from the main first input waveguide 106a and transmitted through the arrayed-waveguide diffraction grating is similar to the transmittance spectrum of the child optical waveguide chip 101 as shown in FIG. 17A. In other words, the central wavelengths of transmittance to the first output waveguide 107 are 1275 nm, 1325 nm, 1375 nm, 1425 nm, 1475 nm, 1525 nm, 1575 nm, and 1625 nm.

Figure 17B:
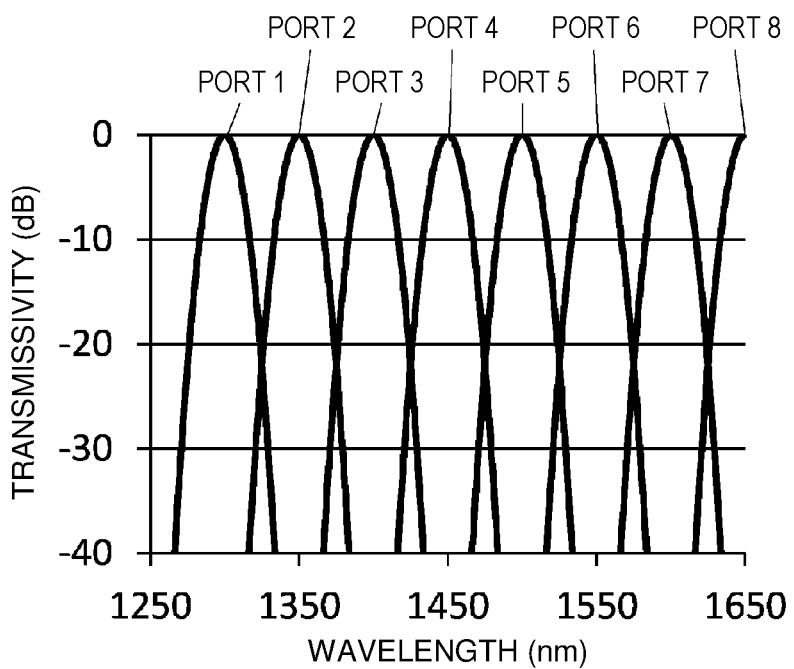
FIG. 17B is a characteristic diagram showing a calculation result of a spectrum which is input from a sub input waveguide 106b of the optical waveguide chip 101a and is transmitted through the arrayed-waveguide diffraction grating.

On the other hand, the spectrum (calculated value) input from the sub first input waveguide 106b and transmitted through the arrayed-waveguide diffraction grating is shifted by half the wavelength interval as shown in FIG. 17B, and wavelengths are 1300 nm, 1350 nm, 1400 nm, 1450 nm, 1500 nm, 1550 nm, 1600 nm, and 1650 nm. In other words, the transmittance spectrum from the main first input waveguide 106a and the spectrum from the sub first input waveguide 106b are alternated.

Compared with the case where one input waveguide is provided in the arrayed-waveguide diffraction grating, the case where the main first input waveguide 106a and the sub first input waveguide 106b are provided has the following effect. When one input waveguide is provided, since the transmissivity is low when the light of the wavelength between the transmittance spectra of the first output waveguides 107 adjacent to each other is incident, the light converted into the visible light from the near-infrared light is also weak, and light emission in the light conversion unit 102 may not be recognized.

For example, the transmitted light intensity of port 1 and port 2 at the wavelength of 1300 nm in FIG. 17A is deteriorated by 20 dB as compared with the wavelength (wavelength of 1275 nm or 1325 nm) at which the transmittance most occurs.

Figure 18:
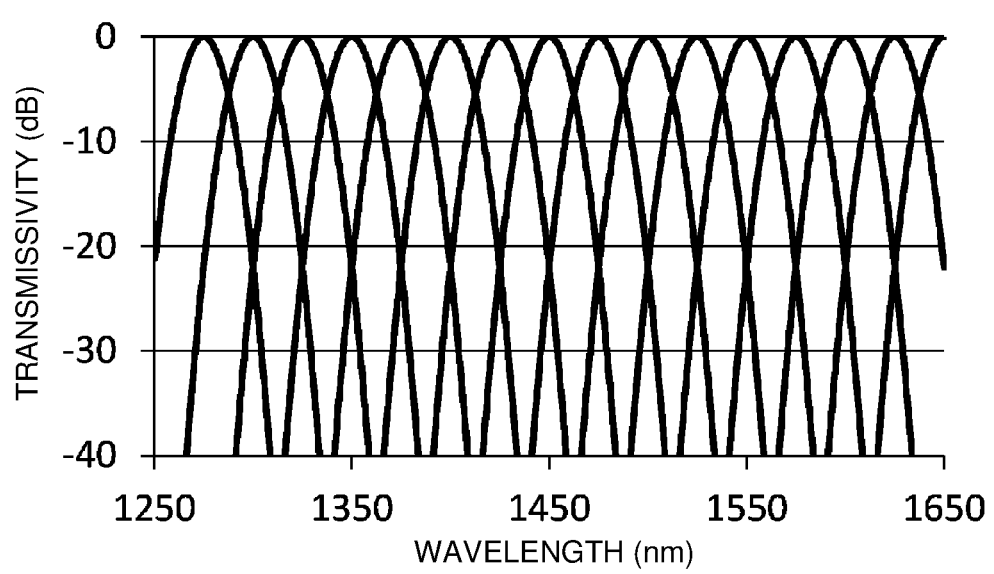
FIG. 18 is a characteristic diagram showing a spectrum obtained by a combination of the spectrum shown in FIG. 17A and the spectrum shown in FIG. 17B.

On the other hand, when the main first input waveguide 106a and the sub first input waveguide 106b are used, signal light is also incident to the sub first input waveguide 106b, the transmitted light intensity of port 1 at the wavelength of 1300 nm becomes the wavelength at which the transmittance most occurs. As a result, when the main first input waveguide 106a and the sub first input waveguide 106b are used, as shown in FIG. 18 obtained by an overlay of FIG. 17A and FIG. 17B, it can be seen that the transmitted light intensity is also deteriorated by 5 dB at the wavelength, at which the transmittance does not occur most, compared with the maximum transmittance wavelength (excluding around the wavelength of 1250 nm).

Accordingly, even when the signal light is incident with only one input waveguide and the wavelength is unknown because the transmitted light intensity with respect to the signal light is weak, the signal light enters the main first input waveguide 106a and the sub first input waveguide 106b, and thus stronger emission light can be obtained in the light conversion unit 102 and the wavelength can be more reliably recognized.

Embodiment 4

A wavelength checker according to Embodiment 4 of the present invention will be described below with reference to FIG. 19. In Embodiment 4, the child optical waveguide chip 101a shown in FIG. 15 is used instead of the child optical waveguide chip 101 in the wavelength checker described with reference to FIGS. 5A, 5B, and 5C and a child optical waveguide chip 121a including an arrayed-waveguide diffraction grating having a narrow demultiplexing wavelength interval is used instead of the child optical waveguide chip 121 including the linear optical waveguide in the wavelength checker described with reference to FIGS. 5A, 5B, and 5C. The arrayed-waveguide diffraction grating of the child optical waveguide chip 121a is a 10-port arrayed-waveguide diffraction grating in which a demultiplexing wavelength is from 1550 nm to 1600 nm and a demultiplexing wavelength interval is 5 nm.

Figure 19:
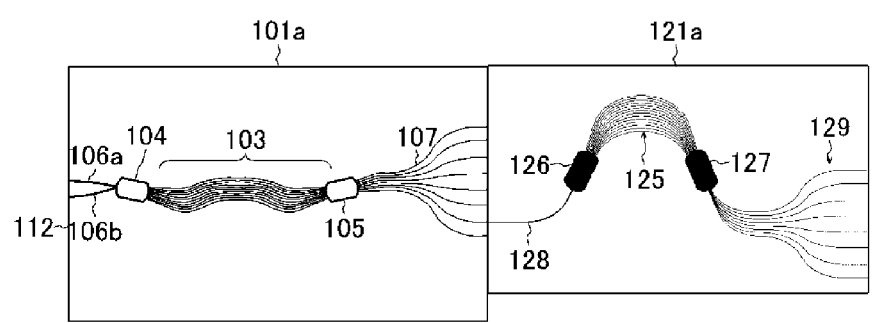
FIG. 19 is a plan view showing a partial configuration of a wavelength checker according to Embodiment 4 of the present invention.

First, as shown in FIG. 19, a configuration is considered in which light enters from a main first input waveguide 106a to the arrayed-waveguide diffraction grating of the child optical waveguide chip 101a and a second input waveguide 128 of the child optical waveguide chip 121a is connected to port 7 in first output waveguides 107 of the child optical waveguide chip 101a. A transmittance wavelength spectrum of the arrayed-waveguide diffraction grating of the child optical waveguide chip 121a is as shown in FIG. 12, and a combination of a transmittance spectrum of the child optical waveguide chip 101*a* and the child optical waveguide chip 121*a* is a form of a spectrum as shown in FIG. 20 as described above.

Figure 21:
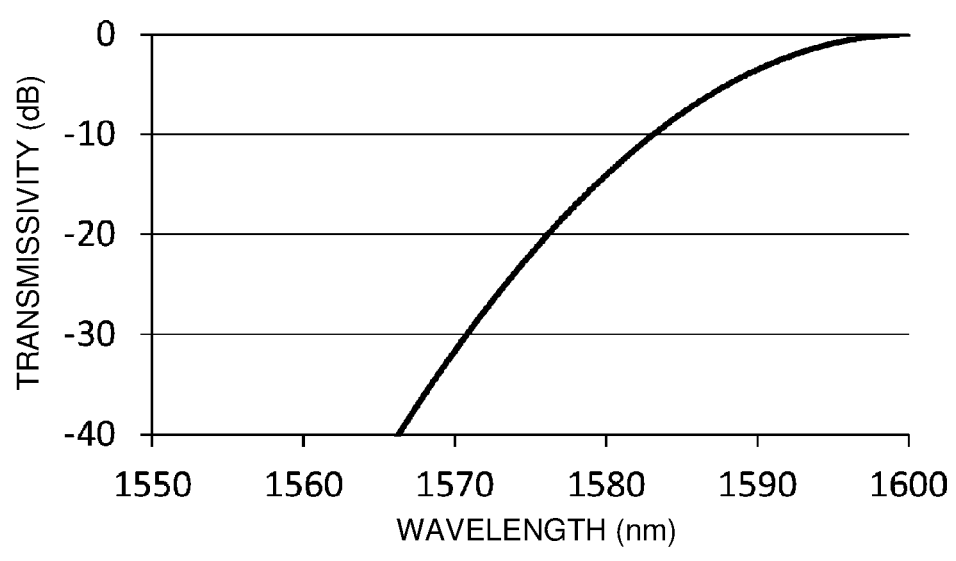

Next, a configuration is considered in which light enters from the sub first input waveguide 106*b* to the arrayed-waveguide diffraction grating of the child optical waveguide chip 101*a* and the second input waveguide 128 of the child optical waveguide chip 121*a* is connected to port 7 in the first output waveguides 107 of the child optical waveguide chip 101*a*. A transmittance spectrum of port 7 of the child optical waveguide chip 101*a* is as shown in FIG. 21. It can be seen that the spectrum shown in FIG. 21 is shifted to a long wave by a half wavelength interval (25 nm) compared with the transmittance spectrum (FIG. 13) when the light enters from the main first input waveguide 106*a*. On the other hand, since the transmittance spectrum of the child optical waveguide chip 121*a* is represented as shown in FIG. 12, the spectrum transmitted through the child optical waveguide chip 101*a* and the child optical waveguide chip 121*a* is represented as shown in FIG. 22.

Figure 23:
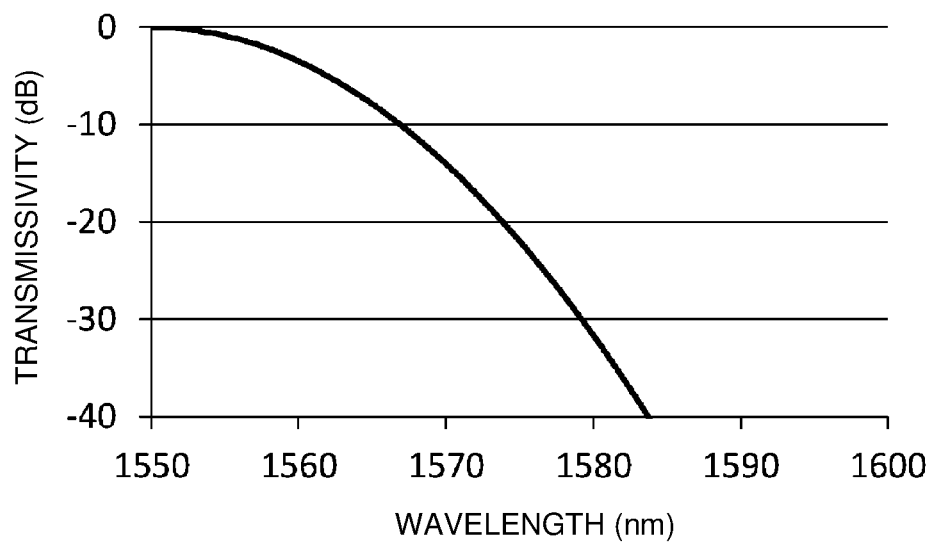

Next, a configuration is considered in which light enters from the sub first input waveguide 106*b* to the arrayed-waveguide diffraction grating of the child optical waveguide chip 101*a* and the second input waveguide 128 of the child optical waveguide chip 121*a* is connected to port 6 in the first output waveguides 107 of the child optical waveguide chip 101*a*. A transmittance spectrum of port 6 of the child optical waveguide chip 101*a* is as shown in FIG. 23. The spectrum shown in FIG. 23 is shifted to a short wave by a wavelength interval compared with the spectrum shown in FIG. 13. On the other hand, since the transmittance spectrum of the child optical waveguide chip 121*a* is represented as shown in FIG. 12, the spectrum transmitted through the child optical waveguide chip 101*a* and the child optical waveguide chip 121*a* is represented as shown in FIG. 24.

Figure 20:
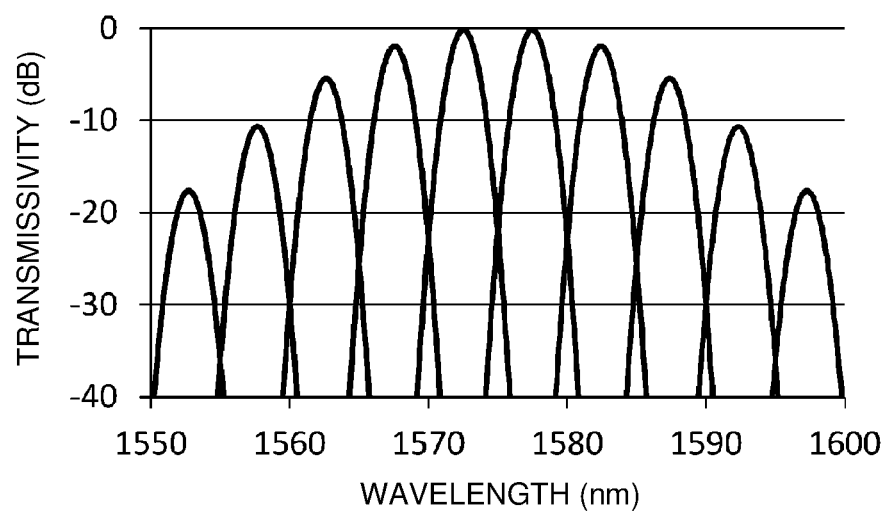
Figure 22:
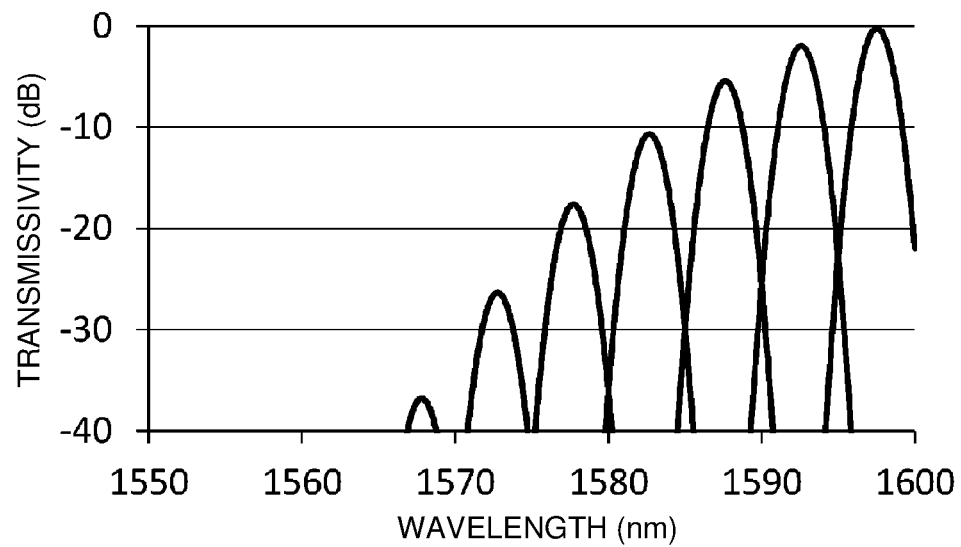
Figure 24:
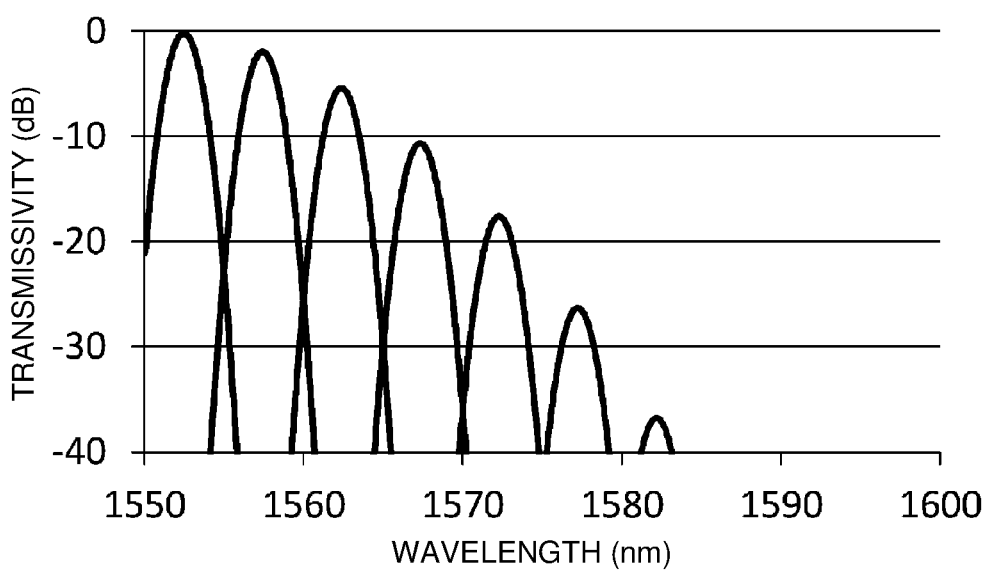
Figure 25:
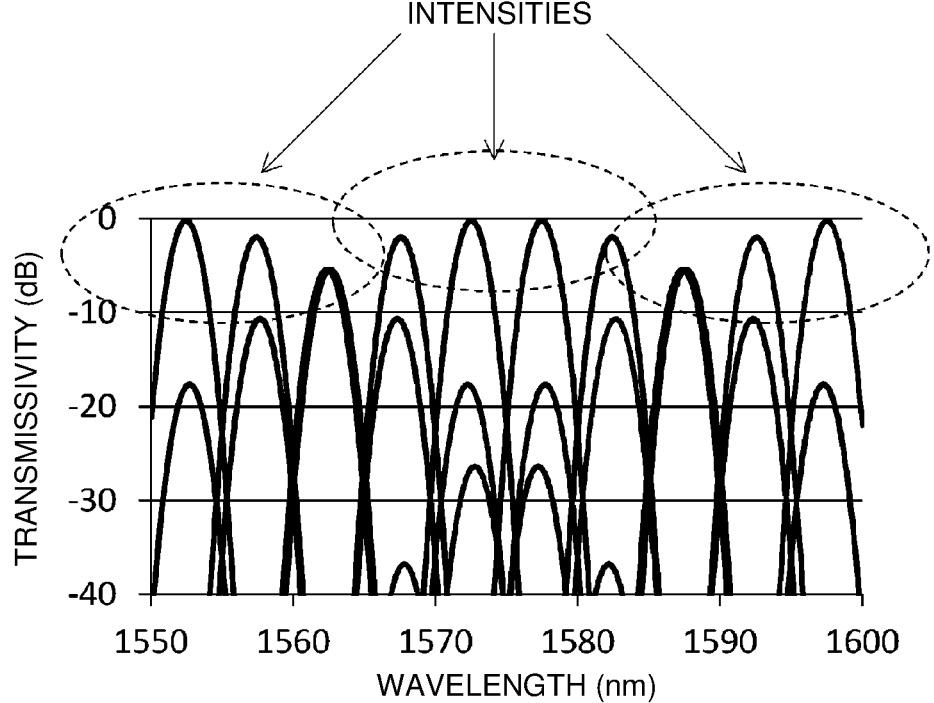
FIG. 25 is a characteristic diagram showing a spectrum obtained by a combination of the spectrum shown in FIG. 20, the spectrum shown in FIG. 22 and the spectrum shown in FIG. 24.

From the above description, the transmittance spectrum using the main first input waveguide 106*a* and the sub first input waveguide 106*b* of the child optical waveguide chip 101*a* is a spectrum, which is shown in FIG. 25, obtained by a combination of the spectrum shown in FIG. 20, the spectrum shown in FIG. 22, and the spectrum shown in FIG. 24.

The combination of the transmittance spectrum of the child optical waveguide chip 101 and the child optical waveguide chip 121*a* is as shown in FIG. 14, the transmissivity is high at wavelengths of 1570 nm to 1580 nm, but the transmissivity is low in the vicinity of 1550 nm and 1600 nm, so that the signal light may not be recognized. On the other hand, the combination of the transmittance spectrum of the child optical waveguide chip 101*a* and the child optical waveguide chip 121*a* is as shown in FIG. 25, and the transmissivity is high even in the vicinity of 1550 nm and 1600 nm, so that it is possible to widen the wavelength range in which the signal light can be recognized.

In the above description, the wavelength domain having high transmissivity is widened using the child optical waveguide chip 101*a* including the two main first input waveguide 106*a* and sub first input waveguide 106*b*, but the wavelength domain having high transmissivity can also be further widened using two input waveguides in the arrayed-waveguide diffraction grating of the child optical waveguide chip 121*a*.

Embodiment 5

Figure 26:
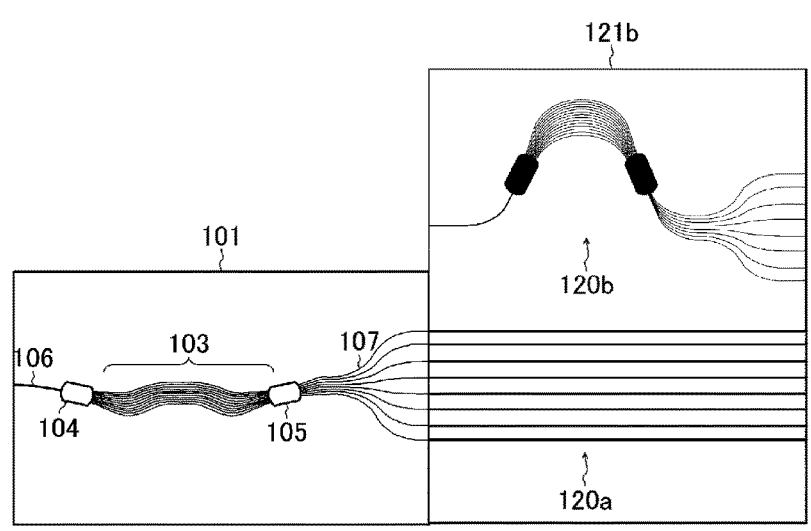
FIG. 26 is a plan view showing a partial configuration of a wavelength checker according to Embodiment 5 of the present invention.
Figure 27:
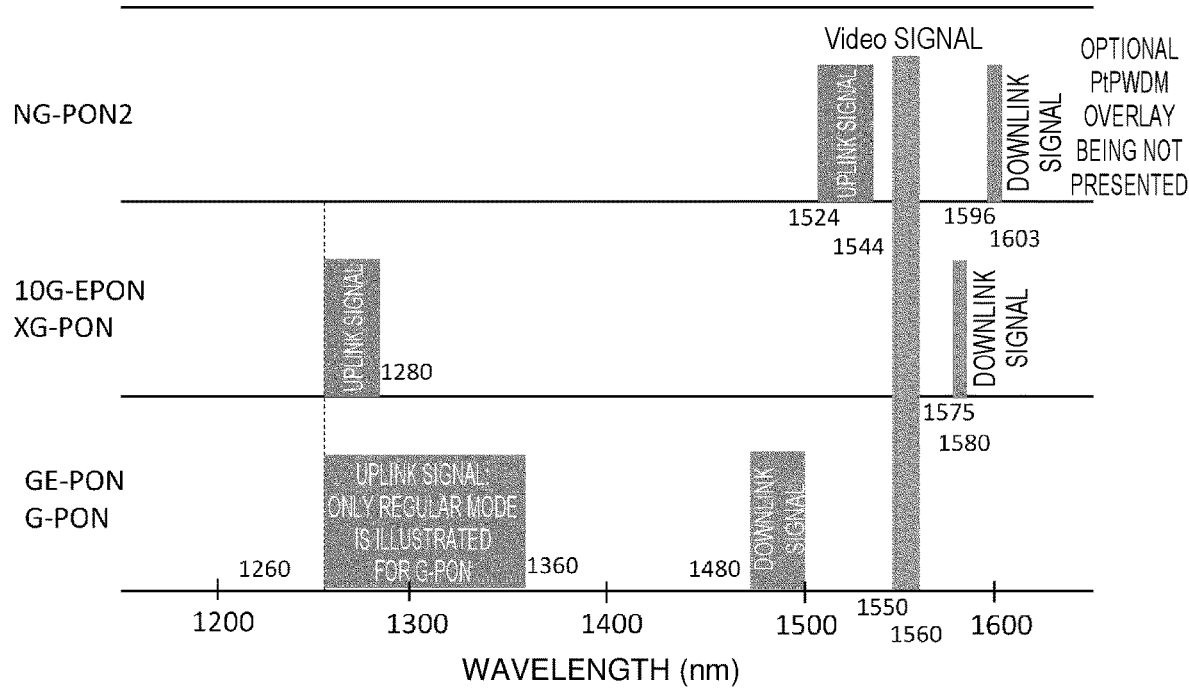
FIG. 27 is an explanatory diagram for explaining a relation of wavelength arrangements of NG-PON2, 10G-EPON (XG-PON), and GE-PON (G-PON).

A wavelength checker according to Embodiment 5 of the present invention will be described below with reference to FIG. 26. As shown in FIG. 26, a child optical waveguide chip 121*b* including an optical waveguide unit 120*a* formed of linear optical waveguides and an arrayed-waveguide diffraction grating 120*b* having a narrow demultiplexing wavelength interval is used instead of the child optical waveguide chip 121*a* of the wavelength checker described with reference to FIG. 11.

An additional groove for fitting with the child optical waveguide chip 121*b* is provided in the parent optical chip on which the child optical waveguide chip 101 and the child optical waveguide chip 121*b* are mounted, so that the child optical waveguide chip 121*b* can be moved in a direction perpendicular to the optical waveguide direction. With such a configuration, the child optical waveguide chip 121*b* is slide on the parent optical chip to move the child optical waveguide chip 121*b*, so that a connection between the child optical waveguide chip 101 and the optical waveguide unit 120*a* and a connection between the child optical waveguide chip 101 and the arrayed-waveguide diffraction grating 120*b* can be switched.

In the mounting by the PPCP described above, it is necessary to separately prepare the child optical waveguide chip 121 and the child optical waveguide chip 121*a*, but according to Embodiment 5, one child optical waveguide chip 121*b* may be prepared, so that the number of components can be reduced. Generally, the arrayed-waveguide diffraction grating of the child optical waveguide chip 121*a* needs to prepare a separate arrayed-waveguide diffraction grating when the wavelength bands are different, but according to Embodiment 5, for example, an arrayed-waveguide diffraction grating required for the wavelength domain in which verification resolution is increased may be inserted in the child optical waveguide chip 121*b* with the range allowed by the chip space.

As described above, according to embodiments of the present invention, the light conversion unit made of the conversion material, which converts the infrared light into the visible light, is provided closer to the output sides of the plurality of first output waveguides of the optical waveguide chip and is arranged to be capable of receiving the light emitted from the plurality of first output waveguides, so that it is possible to easily perform the checking whether the signal light is present during the operational/failure isolation of the PON system.

INDUSTRIAL APPLICABILITY

Note that the present invention is not limited to the embodiment described above, and it is obvious that many modifications and combinations can be implemented by those skilled in the art within the technical scope of the present invention.

REFERENCE SIGNS LIST

101 Array waveguide chip
102 Light conversion unit
103 First arrayed waveguide
103*a* Core portion
104 First input-side slab waveguide
104*a* Core portion
105 First output-side slab waveguide
106 First input waveguide
106*a* Main input waveguide
106*b* Sub input waveguide
107 First output waveguide
108 Output end 111 Substrate
112 Lower clad layer
113 Upper clad layer
120a Optical waveguide unit
120b Arrayed-waveguide diffraction grating
121 Optical waveguide chip
121a Child optical waveguide chip
121b Child optical waveguide chip
122 Substrate
123 Core
124 Clad layer
124a Lower clad layer
124b Upper clad layer
125 Second array waveguide
126 Second input-side slab waveguide
127 Second output-side slab waveguide
128 Second input waveguide
129 Second output waveguide.

The invention claimed is:

1. A wavelength checker comprising:
an optical waveguide chip on a main board;
a light convertor made of a conversion material that converts near-infrared light into visible light; and
a support on the main board;
wherein a first side of the optical waveguide chip that is connected to an optical fiber includes an arrayed-waveguide diffraction grating; and
wherein the light convertor is provided on a side surface of the support facing a light emitting end surface of the optical waveguide chip, wherein the light emitting end surface is a surface through which light is configured to be output to an external space.

2. The wavelength checker according to claim 1, wherein the optical waveguide chip comprises a laminated upper layer and a laminated lower layer.

3. The wavelength checker according to claim 2, wherein each of the laminated upper layer and the laminated lower layer of the optical waveguide chip includes a substrate and a clad on the substrate.

4. The wavelength checker according to claim 3, wherein the optical waveguide chip further includes a core.

5. The wavelength checker according to claim 3, a clad of the laminated upper layer and a clad of the laminated lower layer of the optical waveguide chip face each other.

6. The wavelength checker according to claim 5, wherein:
the laminated lower layer is a parent optical waveguide chip;
the laminated upper layer is a plurality of child optical waveguide chips;
a plurality of first grooves are disposed in the clad of the parent optical waveguide chip;
a plurality of second grooves are formed in the clad of the plurality of child optical waveguide chips;
each of the plurality of first grooves is fitted with a part of a plurality of spacer members protruding from the parent optical waveguide chip,
each of the second grooves of the child optical waveguide chip is fitted with a respective protruding portion of the plurality of spacer members;
a first child optical waveguide chip of the plurality of child optical waveguide chips on the first side connected to the optical fiber includes an arrayed-waveguide diffraction grating;
a second child optical waveguide chip of the plurality of child optical waveguide chips includes a linear waveguide group or an arrayed-waveguide diffraction grating; and the parent optical waveguide chip is fixed to the main board.

7. The wavelength checker according to claim 6, wherein each of the spacer members is made of an optical fiber.

8. The wavelength checker according to claim 6, wherein:
a substrate of the plurality of child optical waveguide chips and a substrate of the parent optical waveguide chip is an Si substrate; and
the clad of the plurality of child optical waveguide chips and the clad of the parent optical waveguide chip are each made of quartz glass.

9. The wavelength checker according to claim 6, wherein:
an end surface of the plurality of child optical waveguide chips on a side of the light convertor is located at a same position as an end surface of the parent optical waveguide chip on the side of the light convertor.

10. The wavelength checker according to claim 6, wherein an end surface of the plurality of child optical waveguide chips on a side of the light convertor is arranged closer to the light convertor than an end surface of the parent optical waveguide chip on the side of the light convertor.

11. The wavelength checker according to claim 6, wherein the plurality of child optical waveguide chips is arranged in a column in an incident direction of light.

12. The wavelength checker according to claim 6, wherein:
an arrayed-waveguide diffraction grating included in a first child optical waveguide chip of the plurality of child optical waveguide chips includes an input waveguide, an input-side slab waveguide, a plurality of array waveguides, an output-side slab waveguide, and a plurality of output-side waveguides;
the input-side slab waveguide, the plurality of array waveguides, and the plurality of output-side slab waveguides are formed in plan view to pass through a midpoint of a line segment connecting a center of the input-side slab waveguide and a center of the output-side slab waveguide and to be line-symmetrical about a straight line perpendicular to the line segment;
the input waveguide includes a main input waveguide and a sub input waveguide; and
when an interval at a connection portion of the plurality of output-side waveguides with the output-side slab waveguide is defined as $\Delta x_{out}$, an interval between a connection portion of the main input waveguide with the input-side slab waveguide and a connection portion of the sub input waveguide with the input-side slab waveguide is set to $\Delta x_{out}/2$.

13. The wavelength checker according to claim 1, wherein the conversion material is phosphor.

14. A method comprising:
mounting an optical waveguide chip on a main board;
mounting a support on the main board; and
disposing a light convertor made of a conversion material that converts near-infrared light into visible light on a side surface of the support, wherein the side surface of the support faces a light emitting end surface of the optical waveguide chip;
wherein a first side of the optical waveguide chip that is connected to an optical fiber includes an arrayed-waveguide diffraction grating; and
wherein the light emitting end surface is a surface through which light is configured to be output to an external space.

15. The method according to claim 14, wherein the optical waveguide chip comprises a laminated upper layer and a laminated lower layer.

16. The method according to claim 15, wherein each of the laminated upper layer and the laminated lower layer of the optical waveguide chip includes a substrate and a clad on the substrate.

17. The method according to claim 16, wherein the optical waveguide chip further includes a core.

18. The method according to claim 16, a clad of the laminated upper layer and a clad of the laminated lower layer of the optical waveguide chip face each other.

19. The method according to claim 18, wherein:
the laminated lower layer is a parent optical waveguide chip;
the laminated upper layer is a plurality of child optical waveguide chips;
a plurality of first grooves are disposed in the clad of the parent optical waveguide chip;
a plurality of second grooves are formed in the clad of the plurality of child optical waveguide chips;
each of the plurality of first grooves is fitted with a part of a plurality of spacer members protruding from the parent optical waveguide chip,
each of the second grooves of the child optical waveguide chip is fitted with a respective protruding portion of the plurality of spacer members;
a first child optical waveguide chip of the plurality of child optical waveguide chips on the first side connected to the optical fiber includes an arrayed-waveguide diffraction grating;
a second child optical waveguide chip of the plurality of child optical waveguide chips includes a linear waveguide group or an arrayed-waveguide diffraction grating; and
the parent optical waveguide chip is fixed to the main board.

* * * * *